United States Patent
Panchaksharaiah et al.

(10) Patent No.: US 10,694,137 B2
(45) Date of Patent: Jun. 23, 2020

(54) SYSTEMS AND METHODS FOR RESIZING CONTENT BASED ON A RELATIVE IMPORTANCE OF THE CONTENT

(71) Applicant: Rovi Guides, Inc., San Carlos, CA (US)

(72) Inventors: Vishwas Sharadanagar Panchaksharaiah, Karnataka (IN); Vikram Makam Gupta, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/200,216

(22) Filed: Jul. 1, 2016

(65) Prior Publication Data

US 2017/0332036 A1 Nov. 16, 2017

Related U.S. Application Data

(60) Provisional application No. 62/334,202, filed on May 10, 2016.

(51) Int. Cl.
| | |
|---|---|
| *H04N 5/45* | (2011.01) |
| *H04N 21/431* | (2011.01) |
| *H04N 21/41* | (2011.01) |
| *H04N 21/44* | (2011.01) |
| *H04N 21/439* | (2011.01) |
| *H04N 21/2187* | (2011.01) |
| *H04N 21/45* | (2011.01) |

(52) U.S. Cl.
CPC .......... *H04N 5/45* (2013.01); *H04N 21/2187* (2013.01); *H04N 21/4126* (2013.01); *H04N 21/4312* (2013.01); *H04N 21/4316* (2013.01); *H04N 21/4394* (2013.01); *H04N 21/44008* (2013.01); *H04N 21/4532* (2013.01)

(58) Field of Classification Search
CPC ....................................................... H04N 5/45
USPC ........................................................ 348/565
See application file for complete search history.

(56) References Cited

U.S. PATENT DOCUMENTS

| | | | |
|---|---|---|---|
| 2002/0140862 | A1 | 10/2002 | Dimitrova et al. |
| 2005/0060641 | A1 | 3/2005 | Sezan et al. |
| 2006/0200842 | A1 | 9/2006 | Chapman et al. |
| 2007/0216807 | A1 | 9/2007 | Otsuka et al. |
| 2008/0159708 | A1 | 7/2008 | Kazama et al. |
| 2008/0273856 | A1 | 11/2008 | Bumgardner et al. |
| 2009/0021642 | A1 | 1/2009 | Takabayashi |
| 2009/0102973 | A1 | 4/2009 | Harris |

(Continued)

FOREIGN PATENT DOCUMENTS

| | | |
|---|---|---|
| EP | 1 843 591 | 10/2007 |
| WO | WO 2011037761 | 3/2011 |

*Primary Examiner* — Jefferey F Harold
*Assistant Examiner* — Justin B Sanders
(74) *Attorney, Agent, or Firm* — Haley Guiliano LLP

(57) ABSTRACT

Systems and methods are described herein for providing a media guidance application that resizes content based on a relative importance of the content. For example, a display may have first and second content generated for display. If the first content is more important to a user than the second content, a size of the first content will be increased with respect to a size of the second content on the display. If the second content is more important to the user than the first content, then a size of the second content will be increased with respect to a size of the first content on the display.

20 Claims, 9 Drawing Sheets

(56) References Cited

U.S. PATENT DOCUMENTS

| | | |
|---|---|---|
| 2009/0113481 A1 | 4/2009 | Friedman |
| 2010/0205628 A1 | 8/2010 | Davis et al. |
| 2012/0227063 A1 | 9/2012 | Tsurumi |
| 2012/0230588 A1 | 9/2012 | Nakate et al. |
| 2013/0047175 A1 | 2/2013 | Flores et al. |
| 2014/0201767 A1 | 7/2014 | Seiden et al. |
| 2014/0331242 A1 | 11/2014 | De La Garza et al. |
| 2015/0181301 A1* | 6/2015 | Bloch .............. H04N 21/47217 725/41 |
| 2015/0382047 A1* | 12/2015 | Van Os ................... G06F 16/73 725/38 |
| 2016/0077677 A1* | 3/2016 | Valdes ................ G06F 3/04817 715/719 |
| 2016/0105708 A1 | 4/2016 | Packard et al. |
| 2016/0127763 A1 | 5/2016 | Patel et al. |
| 2016/0182924 A1* | 6/2016 | Todd .................. H04N 21/2343 725/116 |
| 2016/0227291 A1* | 8/2016 | Shaw ................... H04N 21/251 |
| 2016/0315983 A1* | 10/2016 | Lewis .................... G11B 27/02 |
| 2017/0228444 A1* | 8/2017 | Shaw ............... G06F 17/30554 |

\* cited by examiner

900

902
Generate for simultaneous display on a first display device live audio-visual media and catch-up audio visual media, wherein the catch-up audio-visual media corresponds to a previously broadcast segment of the live audio-visual media.

904
Simultaneously monitor a relative importance of concurrently-presented events from the live audio-visual media and from the catch-up audio-visual media.

906
Retrieve a profile associated with the user, wherein the profile indicates attributes of events that are important to the user.

908
Determine based on the profile, an importance of a first event of the concurrently-presented events from the live audio-visual media and an importance of a second event of the concurrently-presented events from the catch-up audio-visual media

910
Resize at least one of the live audio-visual media and the catch-up audio-visual media based on a comparison of the importance of the first event with respect to the importance of the second event.

SYSTEMS AND METHODS FOR RESIZING CONTENT BASED ON A RELATIVE IMPORTANCE OF THE CONTENT

This application claims the benefit of U.S. Provisional Application No. 62/334,202, filed May 10, 2016, the disclosure of which is hereby incorporated by reference herein in its entirety.

BACKGROUND

In related art, a user can display content from multiple programs at once. Oftentimes, a user may miss a portion of a live video and may watch a replay of the live video in a picture-in-picture window overlaying the live video. The related art may display the replay within a small picture-in-picture window as to only obscure a minimal portion of the live video. However, frequently, content in the small picture-in-picture window may be important to the user. For example, a user may be watching a soccer game. The live video may correspond to a player substitution, which is uninteresting, while the small window may correspond to a replay of a goal scoring play, which is highly interesting. The user may find the goal scoring play more important than the player substitution and may therefore want to view the goal scoring play larger than the substitution. However, the user may be stuck viewing the goal scoring play in the small picture-in-picture window despite the play having greater importance than the substitution.

SUMMARY

Systems and methods are described herein for providing a media guidance application that adjusts a size of content on a display screen based on a relative importance of the content. For example, a user may be watching a live football game in a full-screen window of a display and may be watching a replay of the football game in a picture-in-picture window overlaying the live football game. The media guidance application may identify a first event in the live football game, such as a halftime show, and may identify a second event in the replay, such as a touchdown play. The media guidance application may determine an importance for the first event and the second event relative to a profile of the user. For example, the media guidance application may determine that the user is more interested in the touchdown play than the halftime show because, for example, the user's favorite team scores the touchdown during the touchdown play. The media guidance application may increase a size of the reply and/or may decrease a size of the live video because the media guidance application determined that the replay is more important than the live video. Therefore, the media guidance system may be configured to adjust the size of media based on a relative importance of each media to the user.

In some aspects, the media guidance application may resize content on a display device based on a relative importance of the content. For example the media guidance application may generate for simultaneous display on a first display device live media and a catch-up portion of the live media (e.g., a replay from the live media). The media guidance application may determine how important the live media is to a user and how important the catch-up portion is to the user and may resize at least one of the live media and the catch-up media based on the relative importance of the live media with respect to the catch-up media. For example, if the media guidance application determines that a first event in the live media is more important to the user than a simultaneously displayed second event in the catch-up media, the media guidance application may increase a size of the live media with respect to the catch-up media.

In some aspects, the media guidance application may generate for simultaneous display on a first display device live audio-visual media and catch-up audio-visual media, where the catch-up audio-visual media corresponds to a previously broadcast segment of the live audio-visual media. For example, the media guidance application may generate for display live audio-visual media, such as a live football game, on a display, such as a television. The media guidance application may generate for simultaneous display with the live audio-visual media catch-up audio-visual media, such as a replay of an event in the live audio-visual media. For example, the media guidance application may buffer the live audio-visual media (e.g., to allow for trick play modes) and play back a buffered portion of the live audio-visual media in a picture-in-picture window overlaying the live audio-visual media at a later time (e.g., after the event was already generated for display as live audio-visual media).

In some aspects, the media guidance application may simultaneously monitor a relative importance of concurrently-presented events from the live audio-visual media and from the catch-up audio-visual media. For example, the media guidance application may detect events in the live audio-visual media and in the catch-up audio-visual media. For example, the media guidance application may use a video processing algorithm to monitor objects in the live audio-visual media and in the catch-up audio-visual media. The media guidance application may identify a touchdown as an event when the media guidance application detects that a player carries a football into an end zone, the word touchdown appear on the screen, a score changes in a scoreboard by six points, etc.

In some aspects, the media guidance application may retrieve a profile associated with the user, where the profile indicates attributes of events that are important to the user. For example, the media guidance application may retrieve from the profile data indicating a user's favorite sports teams (e.g., New York Giants), television shows (e.g., "Game of Thrones", a fantasy sports roster corresponding to the user, etc. The media guidance application may determine, based on profile, whether an attribute of an event, such as a touchdown event, is of interest to the user. For example, the media guidance application may retrieve data identifying a team that scored the touchdown and may compare the team to the user profile to determine whether the team is a favorite of the user. If the media guidance application may determine that the touchdown event is important if the team that scored the touchdown is also a favorite of the user.

In some embodiments, the media guidance application may identify an object having importance to the user based on the profile. For example, the media guidance application may perform an image processing algorithm on a frame of the audio-visual media to identify objects in the frame. The media guidance application may compare the objects in the frame to objects identified as important to the user based on the profile. For example, the media guidance application may retrieve a user's fantasy sports roster from the profile. The media guidance application may determine that a first object, such as a player in the user's fantasy sports roster is important to the user because the performance of the player may affect a fantasy sports score of the user.

In some embodiments, the media guidance application may perform object recognition on a first frame corresponding to a first event (e.g., a touchdown) in the live audio-visual media and a second frame corresponding to a second event (e.g., a rushing play) in the catch-up audio-visual media to determine whether the object appears in one of the first and the second frame. For example, the media guidance application may identify a first set of players in the first frame and a second set of players in the second frame. The media guidance application may compare each player in the first set of players and each player in the second set of players to players in the roster to determine whether there is a match. When the media guidance application determines that there is a match, the media guidance application may determine that the corresponding frame is important.

In some aspects, the media guidance application may determine, based on the profile, an importance of a first event of the concurrently-presented events from the live audio-visual media and an importance of a second event from the concurrently-presented events from the catch-up audio-visual media. For example, the media guidance application may identify players in the catch-up audio-visual media and the live audio-visual media as described above. The media guidance application may determine that the media that also comprises players that are on the user's fantasy sports roster is important (e.g., because an event in the media may affect a user's fantasy sports score).

In some embodiments, the media guidance application may determine that an importance of a first event is greater than an importance of a second event in response to determining that the object appears in the first frame. For example, the media guidance application may determine the first event corresponds to a touchdown scored by a player on the user's fantasy sports roster (e.g., based on the image processing of the first frame) and that the second event corresponds to a touchdown scored by a player not on the user's fantasy sports roster. The media guidance application may determine that the first event is more important because the first frame comprises a player on the user's fantasy sports roster but the second frame does not.

In some embodiments, the media guidance application may determine that an importance of the second event is greater than an importance of the first event in response to determining that the object appears in the second frame. For example, the media guidance application may determine that a player on the user's roster appears in the second frame but not in the first frame. The media guidance application may determine that the second event is more important than the first event because the user may be most interested in viewing events related to players in the user's fantasy sports roster.

In some embodiments, the media guidance application may enumerate a first number of objects in the first frame matching the plurality of objects having importance to the user and may enumerate a second number of objects in the second frame matching the plurality of objects having importance to the user. For example, the media guidance application may count a number of players in the first frame and in the second frame that are on the user's fantasy sports roster. The media guidance application may rank the first frame with respect to the second frame based on a respective number of objects having importance to the user within the frame. For example, the media guidance application may rank the first frame higher than the second frame when the first frame comprises a greater number of players that are on the user's fantasy sports roster.

In some embodiments, the media guidance application may determine that the importance of the first event is greater than the importance of the second event in response to determining that the first frame has a highest respective amount of objects matching the plurality of object having importance to the user. For example, the media guidance application may determine, based on the enumeration, that the first event is more important than the second event when the first event includes more players on the user's fantasy sports roster than the second event.

In some embodiments, the media guidance application may determine a first event type of the first event and a second event type of the second event. For example, the media guidance application may determine that a first event in the live audio-visual media (e.g., live football game) corresponds to a touchdown in the live football game (e.g., based on detecting the voice of a commentator announcing the touchdown). The media guidance application may determine that a second event, simultaneously displayed with the first event, in the catch-up audio-visual media corresponds to a five yard running play (e.g., by detecting that a player is running with the football using an image processing algorithm). The media guidance application may retrieve, from a database, a set of popular event types. For example, the media guidance may determine, based on the set of popular types, that a touchdown is a popular type but a five yard running play is not a popular type because a touchdown may affect a team's chance of winning greater than a five yard running play would affect a team's chance of winning.

In some embodiments, the media guidance application may compare each type from the set of popular types to determine whether the first event type or the second event type matches a popular type from the set. For example, the media guidance application may compare the type of the first event to the set of important event types and may determine that the first event corresponds to an important event if the first event type matches a type from the set (e.g., if the first event type is a touchdown the media guidance application may determine that the first event is important, if the second event type corresponds to a five yard running play the media guidance application may determine that second event is not important). The media guidance application may determine that the importance of the first event is greater than the importance of the second event when the first event type matches a popular event from the set. In contrast, the media guidance application may determine that the importance of the second event is greater than the importance of the first event when the second event type matches the popular event type from the set.

In some embodiments, the media guidance application may monitor a first volume associated with audio of the live audio-visual media and a second volume associated with audio of the catch-up audio-visual media to determine whether the live or the catch-up audio-visual media is more important. For example, the media guidance application may determine that the media corresponding to a louder volume is more important (e.g., because a volume may be louder when fans in a sports game are cheering during an important event). For example, the media guidance application may determine that the first event has greater importance than the second event when the first volume is greater than the second volume and may determine that the second event has greater importance than the first event when the second volume is greater than the first volume. For example, when a touchdown occurs during the first event, the volume of the first event may be loud because fans may be cheering for the touchdown. In contrast, when the event is a player substitution, the volume may be low because the fans may not be cheering. The media guidance application may predict, based on the volume, whether the event is important or not.

In some aspects, the media guidance application may resize at least one of the live audio-visual media and the catch-up audio-visual media based on a comparison of the importance of the first event with respect to the importance of the second event. For example, the media guidance application may generate for display the live audio-visual media larger than the catch-up audio-visual media (e.g., by increasing a size of the live audio-visual media with respect to the catch-up audio-visual media) when the media guidance application determines that an importance of the first event (e.g., corresponding to the live audio-visual media) is greater than an importance of the second event (e.g., corresponding to the catch-up audio-visual media). In contrast, the media guidance application may generate for display the catch-up audio-visual media larger than the live audio-visual media (e.g., by increasing a size of the catch-up audio-visual media with respect to the live audio-visual media) when the media guidance application determines that an importance of the second event is greater than an importance of the first event.

In some embodiments, the media guidance application may toggle an audio of the live audio-visual media and of the catch-up audio-visual media based on their respective importance. For example, the media guidance application may toggle an audio output to the audio of the live audio-visual media in response to determining that the importance of the live audio-visual media is greater than the importance of the catch-up audio-visual media. In contrast, the media guidance application may toggle an audio output to the audio of the catch-up audio-visual media in response to determining that the importance of the catch-up audio-visual media is greater than the importance of the live audio-visual media. For example, the media guidance application may generate audio output for the audio-visual media that is most important to the user.

In some embodiments, the media guidance application may compute a difference between an importance of the first event and an importance of the second event and may resize the media based on the difference. For example, the media guidance application may count a number of objects of interest to the user, such as a number of players on a fantasy sports roster, corresponding to the first event and to the second event. The media guidance application may compute a difference between the counts and may resize at least one of the live audio-visual media and catch-up audio-visual media such that a difference in a size of the live audio-visual media with respect to a size of the catch-up audio-visual media on the first display device is proportional to the difference between the importance of the first event and the importance of the second event. For example, if the first event comprises one fantasy sports player but the second event comprises two fantasy sports players, the media guidance application may generate for display the live audio-visual media using one third of the display and may generate for display the second audio-visual media using two thirds of the display.

In some embodiments, the media guidance application may generate for display the catch-up audio-visual media in a picture-in-picture window in response to determining that an importance of the event corresponding to the catch-up audio-visual media is less important than an event corresponding to the live audio-visual media. For example, the media guidance application may overlay the catch-up media over the live audio-visual media on a first display device when an importance of an event in the live audio-visual media is greater than an event in the catch-up audio-visual media.

In some embodiments, the media guidance application may detect objects in the live audio-visual media that are important to the user and may change a size of the catch-up audio-visual media overlay so that the overlay does not obstruct the objects. For example, the media guidance application may identify a location of an object that is important to the user, such as a player, and may track the location of the user within a frame of the live audio-visual media. The media guidance application may determine, based on the location of the object (e.g., location of a player on the screen) whether the catch-up audio-visual media overlays a position of the object within the frame. For example, the media guidance application may determine where the catch-up media overlays the live media and may correlate the location of the overlay with the location of the object. If the media guidance application determines that the locations match, the media guidance application will determine that the catch-up media overlays the object. In response to determining that the catch-up audio-visual media overlays the location of the object within the frame, the media guidance application may resize the catch-up audio-visual media to exclude overlaying the location of the object. For example, the media guidance application may reduce a size of the catch-up audio-visual media so that it no longer overlays the object or the media guidance application may generate for display the catch-up audio-visual media in another location of the display, or on a second display device, so that the object is no longer obstructed.

In some embodiments, the media guidance application may identify a first and a second display accessible to the user. For example, the media guidance application may identify, based on the profile, a second display device accessible to the user, such as a mobile device associated with the profile of the user. The media guidance application may retrieve a size of the first display (e.g., a television) and the second display (e.g., display of the mobile device) and may determine where to generate for display the live and the catch-up audio-visual media based on a size of the displays. The media guidance application may generate for display the catch-up audio-visual media on the first display (e.g., television) when the importance of the second event is greater than the importance of the first event in response to determining that the first display larger than the second display (e.g., so that the user can view the more important event on the larger screen). In contrast, the media guidance application may generate for display the live audio-visual media on the first display when the importance of the first event is greater than the importance of the second event (e.g., so that the user can view the more important event on the larger display).

It should be noted that the systems and/or methods described above may be applied to, or used in accordance with, other systems, methods, and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 9 is a flow chart of illustrative steps for resizing content on a display device based on a relative importance of the content in accordance with some embodiments of the disclosure;

DETAILED DESCRIPTION OF DRAWINGS

Figure 1:
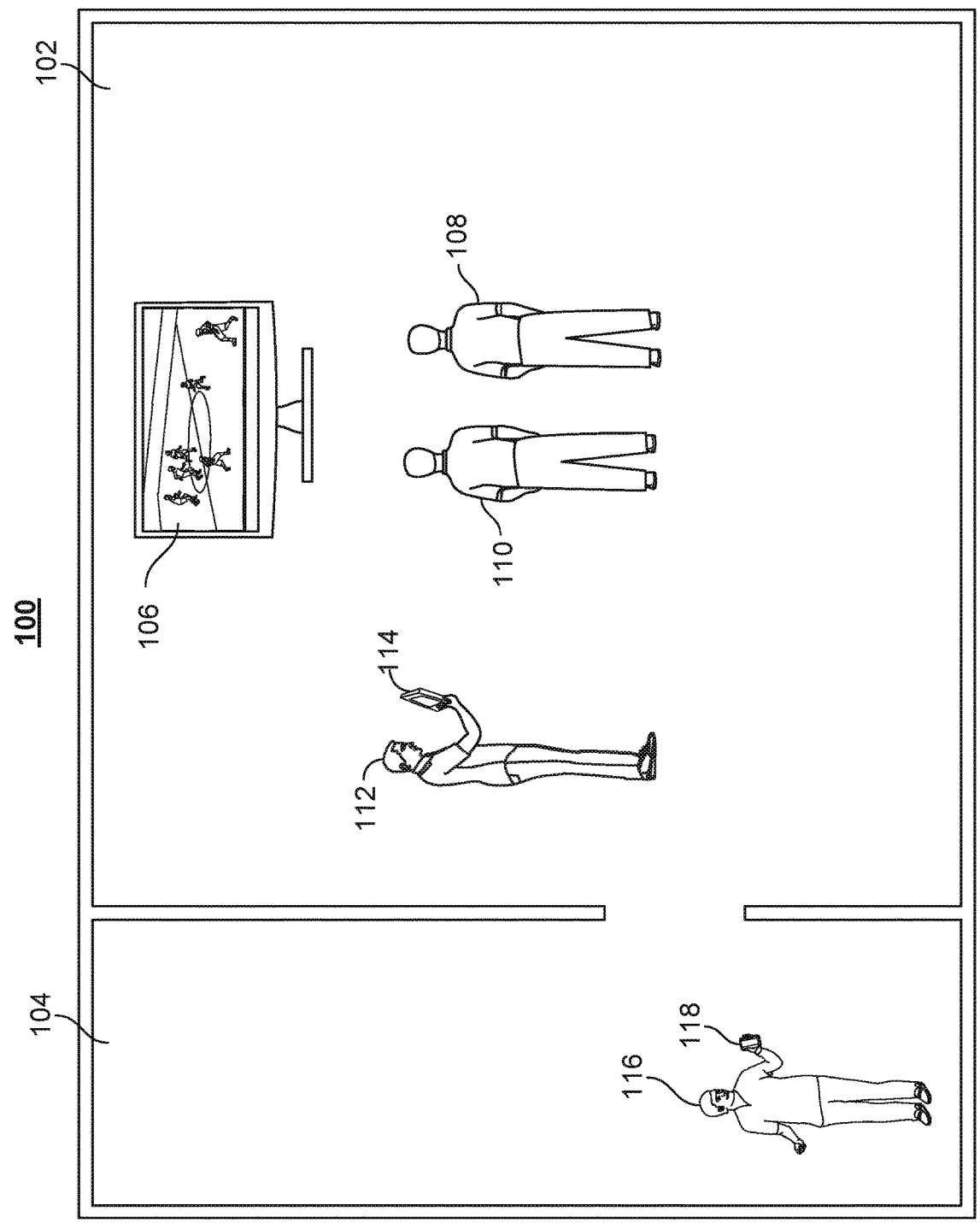
FIG. 1 shows an illustrative example of user interaction with a media guidance system in accordance with some embodiments of the disclosure.

Systems and methods are described herein for providing a media guidance application that adjusts a size of content on a display screen based on a relative importance of the content. For example, a user may miss a portion of a live video, such as a live football game, and may wish to catch-up on content that was missed. A media guidance application may buffer the missed portion of the football game and may allow the user to play back a buffered portion of the football game at a time after it was originally rendered by the media guidance application. The media guidance application may generate for display the live football game in a full-screen window of a display, such as a television, and may generate for display the catch-up portion in a picture-in-picture window overlaying the live football game.

The media guidance application may determine a size of the picture-in-picture window with respect to a size of a window comprising the live video based on an importance of an event in the catch-up content and an importance of an event in the live video. For example, media guidance application may identify a first event in the live football game, such as a halftime show, and may identify a second event in the catch-up content, such as a touchdown play. The media guidance application may determine an importance for the first event and the second event based on a profile of the user. For example, the media guidance application may determine that the user is more interested in the touchdown play than the halftime show because, for example, the user's favorite team scores the touchdown during the touchdown play. The media guidance application may increase a size of the picture-in-picture window and/or may decrease a size of the window comprising the live football game because the media guidance application determined that the catch-up content is more important than the live football game. Therefore, the media guidance system may be configured to adjust the size of media based on a relative importance of each media to the user.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), notification information (e.g., text, images, media clips, etc.), on-demand information, blogs, websites, and any other type of guidance data that is helpful for a user to navigate among and locate desired content selections.

In some embodiments, control circuitry 704, discussed further in relation to FIG. 7 below, executes instructions for a media guidance application stored in memory (i.e., storage 708). Specifically, control circuitry 704 may be instructed by the media guidance application to perform the functions discussed above and below. For example, the media guidance application may provide instructions to control circuitry 704 to generate the media guidance displays discussed in relation to FIG. 2, FIG. 3, FIG. 4, FIG. 5, and FIG. 6. In some implementations, any action performed by control circuitry 704 may be based on instructions received from the media guidance application.

As referred to herein, the term "in response to" refers to initiated as a result of. For example, a first action being performed in response to a second action may include interstitial steps between the first action and the second action.

As referred to herein, the term "directly in response to" refers to caused by. For example, a first action being performed directly in response to a second action may not include interstitial steps between the first action and the second action.

FIG. 1 shows an illustrative embodiment of users detected by a media guidance application, in accordance with some embodiments of the disclosure. Building 100 is depicted as having two rooms, large room 102 and small room 104. Large room 102 is depicted as having user equipment 106. User 110 and user 108 are depicted in large room 102 facing user equipment 106. User 112 is depicted in large room 102 using user equipment 114. User 116 is depicted in small room 104, away from user equipment 106. User 116 is depicted holding user equipment 118.

In some aspects, user equipment 106 may comprise control circuitry (e.g., control circuitry 704) that executes a media guidance application for resizing content on a display device based on a relative importance of the content. User equipment 106, 114, and 118 may have all the same capabilities of user television equipment 802, user computer equipment 804, and wireless user communications device 806 discussed further in relation to FIG. 8 below. For example, the media guidance application may determine that a first user and a second user are watching a soccer game. For example, the media guidance application may generate for display live media and catch-up media corresponding to a sporting event, such as a soccer game. For example, the media guidance application may retrieve a broadcast of the live audio-visual media via media content source 816 (discussed further below in relation to FIG. 8). The media guidance application may buffer a portion of the live audio-visual media so that the user can play back the buffered media at a time after an original broadcast time of the live media. For example, the media guidance application may record frames corresponding to the live media in a memory (such as storage 708, discussed further in relation to FIG. 7 below). The media guidance application may display a catch-up (e.g., a replay) of the live media by generating for display frames from the buffer in a picture-in-picture window overlaying the live media. The media guidance application may determine a size of a display window for the live media and a size of the picture-in-picture window based on a computed importance of events in the live and catch-up media.

Figure 2:
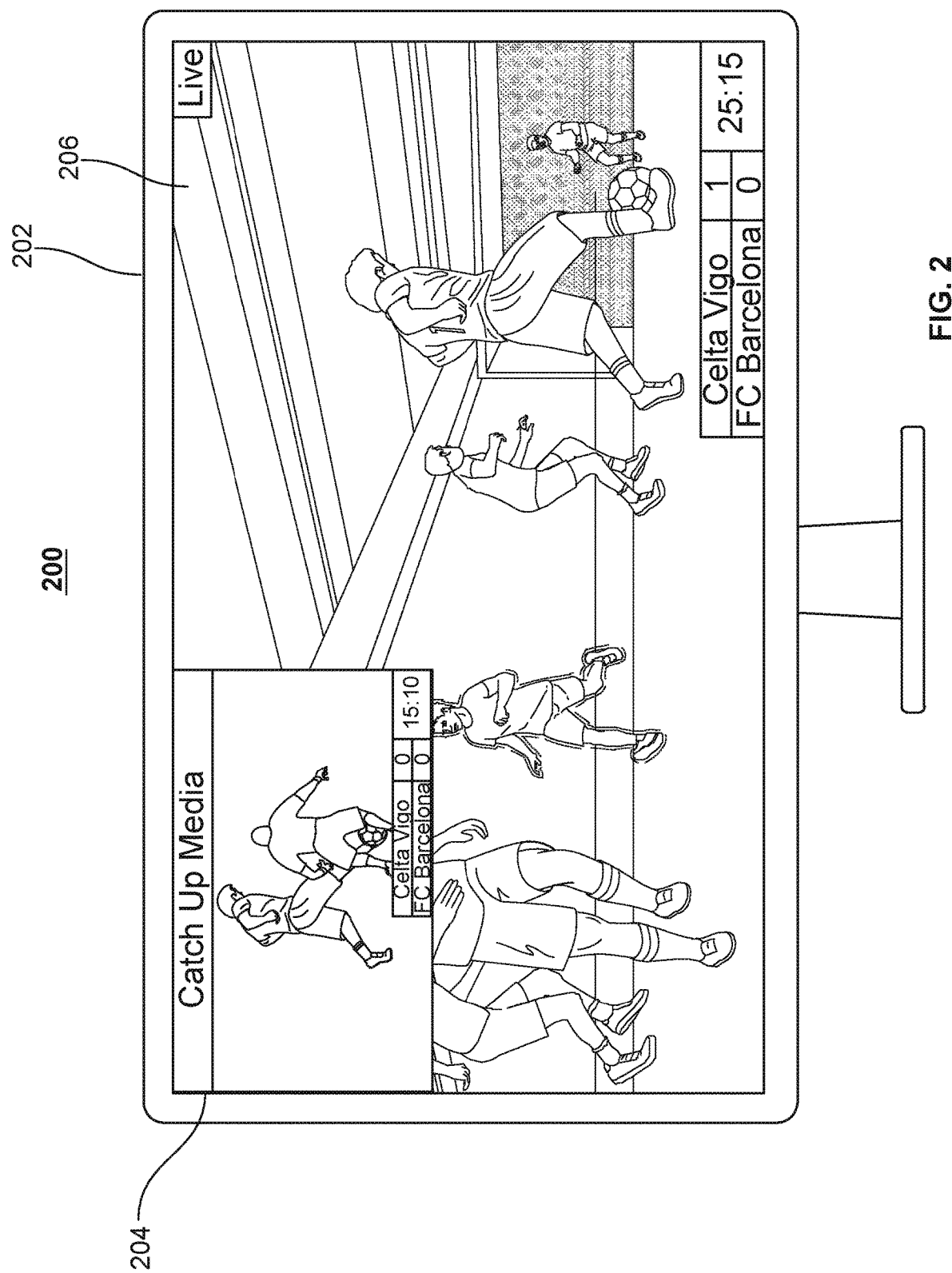
FIG. 2 shows an illustrative example of live media played back on user equipment having an overlay of catch-up media in accordance with some embodiments of the disclosure.

FIG. 2 shows an illustrative embodiment of catch-up audio-visual media overlaying a live audio-visual media on a display of user equipment, in accordance with some embodiments of the disclosure. User equipment 200 is depicted having display 202. Display 202 may correspond to display 712 of user equipment device 700 (discussed further in relation to FIG. 7). Live audio-visual media 206 is depicted in a full-screen mode on display 202 having an overlay of catch-up audio-visual media 204, obstructing a portion of the full screen live audio-visual media 206. The media guidance application may optionally generate for display live audio-visual media 206 and/or catch-up audio-visual media 204 on any one of user equipment 106, 114, 118, 402, 406, user television equipment 802, user computer equipment 804, and/or wireless user communications device 806.

In some aspects, the media guidance application may generate for simultaneous display on a first display device (e.g., display 202) live audio-visual media and catch-up audio-visual media, where the catch-up audio-visual media corresponds to a previously broadcast segment of the live audio-visual media. For example, the media guidance application may generate for display live audio-visual media 206, such as a live soccer game, on a display, such as a display of user equipment 106, user equipment 114 or user equipment 118. The media guidance application may generate for simultaneous display with live audio-visual media 206 catch-up audio-visual media 204, such as a replay of a previously broadcasted an event in the soccer game. For example, the media guidance application may retrieve from remote storage, such as a server associated with the broadcast media, catch-up audio-visual media, such as a highlight reel corresponding to previously broadcasted events from the live soccer game. The media guidance application may generate for display catch-up audio-visual media 204 retrieved from the server automatically (e.g., because the media guidance application determines that the user missed the event in catch-up audio-visual media 204) or in response to a user input (e.g., based on a user pressing a replay button on an input interface associated with the media guidance application). For example, the media guidance application may generate for display a picture-in-picture window comprising catch-up audio-visual media 204 overlaying live audio-visual media 206 as depicted in FIG. 2.

As referred to herein, the term "audio-visual media" refers to any information comprising a visual component and/or comprising an audio component. In some examples, audio-visual media may comprise both an audio component and a visual component. For example, audio-visual media may be a movie, picture frames of the movie may be the visual component and an audio track associated with the frames of the movie may be the visual component.

As referred to herein, an "event" in audio-visual media may refer to any part of a media asset that is distinguishable from another part of the media asset. For example, an event may correspond to a frame, set of frames, scene, chapter, segment of time, etc. The media guidance application may identify distinct events based on time-marks (e.g., an event begins at a first time mark and ends at a second time mark) in the play length of audio-visual media. Alternatively or additionally, the media guidance application may identify events based on a range of frames (a portion begins at a first frame and ends at a second frame). Alternatively or additionally, the media guidance application may identify events based on content in the audio-visual media (an event may begin at the appearance of particular content and end at the appearance of the same or different content). Alternatively or additionally, the media guidance application may identify events based on metadata associated with the audio-visual media (an event may begin at a first metadata tag and end at a second metadata tag. Alternatively or additionally, the media guidance application may identify events based on an audio associated with the audio-visual media. For example, the media guidance application may identify an event corresponding to a portion of the audio-visual media when the audio volume is above or below a threshold volume and/or when a change in volume over time is above or below a threshold change over time. In another example, the media guidance application may identify events based on the meaning of audio spoken during the audio-visual media, such as an announcer announcing a "Touchdown" may be detected by the media guidance application as corresponding to a touchdown event. In some embodiments, the media guidance application may identify text corresponding to words spoken during the audio-visual media, such as closed captioning text, and may identify an event based on meanings of words in the closed captioning text. The media guidance application may compare words to a set of templates to derive a meaning for the words. Methods for identifying strings of words based on templates, which can be applied by the media guidance, are described in in detail in Venkataraman et al. U.S. patent application Ser. No. 15/055,868, filed Feb. 29, 2016, which is hereby incorporated by reference herein in its entirety.

As referred to herein, a "frame" may be any image associated with audio-visual media. For example, a frame of a movie may be an image captured at a specific point in the movie. A movie may comprise a sequence of frames for playback in a specified order. The media guidance application may perform image processing on a frame of media to determine if there is important content in the media.

In some aspects, the media guidance application may simultaneously monitor a relative importance of concurrently-presented events from live audio-visual media 206 and from catch-up audio-visual media 204. For example, the media guidance application may detect events in live audio-visual media 206 and in catch-up audio-visual media 204 by using a video processing algorithm to monitor objects in live audio-visual media 206 and in catch-up audio-visual media 204. For example, the media guidance application may detect a location (e.g., coordinates on a display comprising the live and the catch-up audio-visual media) of a soccer ball in a soccer game corresponding to live audio-visual media 206 and catch-up audio-visual media 204.

In some embodiments, the media guidance application may run an image processing algorithm, such as an object detection algorithm on a frame of the audio-visual media to identify events in the audio-visual media. For example, the media guidance application may perform edge detection within a particular frame of the audio-visual media and, based on the results, detect contours of various objects within the frame. For example, the media guidance application may perform a search-based or a zero-crossing based edge detection method on a frame of the media. The media guidance application may approximate a first derivative of pixel data corresponding to the frame to derive a gradient for the image (e.g., by convolving the image with a kernel, such as a Sobel operator). Based on the gradient, the media guidance application may identify local minima or maxima in the gradient. The media guidance application may suppress all pixels not identified as a local minima or maxima and may apply thresholding or hysteresis to filter the output.

When the media guidance application completes the edge detection process, the media guidance application may extract an object discovered during edge detection. For example, the media guidance application may create a fingerprint for objects in the frame based on the edge detection algorithm as described above. The media guidance application may compare the fingerprint for the frame to an object database that stores object fingerprints that are known and have been categorized into known objects. The object database may also store descriptions of the objects contained within the object database. When the media guidance application detects a particular object in a frame, the media guidance may retrieve keywords describing the object from the object database. The media guidance application may use the key words to determine whether the event and/or object is important to the user.

In some embodiments, the media guidance application may perform an image processing algorithm to detect characters in a live video. For example, the media guidance application may perform an optical character recognition ("OCR") algorithm to detect characters in the live video and may generate a set of string coordinate pairs corresponding to the text in the live video. For example, the media guidance application may retrieve a frame of the live video, such as a financial news broadcast. The media guidance application may detect text in a news ticker at a bottom of the frame of the media asset (e.g., by performing the object detection procedures as described above and detecting characters). The media guidance application may identify the event and data associated with the event by performing the OCR algorithm on the frame. For example, the media guidance application may determine what player scored a goal in a soccer game by performing the OCR algorithm on text corresponding to an announcer announcing the goal scored by the player.

In some embodiments, the media guidance application may detect events by tracking objects across plurality of frames of the audio-visual media. For example, the media guidance application may track a location of the soccer ball across frames by detecting and storing a location of the soccer ball in each frame of a plurality of frames of the audio-visual media. The media guidance application may detect a location of a goal in the soccer game and may compute a distance between the soccer ball and the goal. The media guidance application may identify an event when the soccer ball moves to within a threshold distance of the goal.

In some embodiments, the media guidance application may detect events based on data retrieved from a plurality of sensors associated with the audio-visual media. For example, the media guidance application may determine that the media is a live soccer event based on metadata of a MPEG-4 stream received by the media guidance application. The media guidance application may query a remote database for sensor information of players or other objects in the live soccer event. For example, the media guidance application may transmit a unique identifier for the live soccer event (e.g., a unique identifier retrieved in the MPEG-4 stream or from program guide information stored in a memory of the media guidance application) to the remote database.

In some embodiments, the media guidance application may retrieve data from a plurality of sensors associated with the sporting event. The media guidance application may retrieve data from a sensor embedded in a soccer ball listing a position in the field and a speed of travel (e.g., based on a GPS or other triangulation sensor), an indication that the ball is rolling on the ground or is being dribbled (e.g., based on a pressure sensor or impedance sensor embedded on the ball), etc. In another example, the media guidance application may retrieve information from sensors embedded on players, such as a force of impact (e.g., based on an accelerometer), sound data from a microphone on the player, a position and speed on the field based on a triangulation sensor, etc.

In some embodiments, the media guidance application may identify events based on the sensor whether the portion is important. For example, the media guidance application may correlate information from the sensors with a look-up table of sensor values indicating important events. For example, the media guidance application may receive an indication that a soccer ball is in close proximity to a soccer goal (e.g., based on the retrieved sensor data). The media guidance application may correlate the position of the soccer ball with a table listing threshold distances between the soccer goal and the soccer ball to identify the event (e.g., a first event for the soccer ball being within five meters of the goal, a second event for the soccer ball being between five to ten meters of the goal).

In some embodiments, the media guidance application may identify an event based on metadata related to the audio-visual media. For example, the media guidance application may retrieve data associated with a HEVC stream associated with live audio-visual media 206 or catch-up audio-visual media 204. For example, media guidance application may identify data denoting a set of frames, scene, chapter, segment of time, etc. in the audio-visual media that is associated with an event. In another example, the media guidance application may identify distinct events based on time-marks (e.g., an event begins at a first time mark and ends at a second time mark) in the play length of audio-visual media denoted in a metadata field of the MPEG-4 video data. In another example, the media guidance may identify objects in a MPEG-4 stream based on data coding the locations of objects in the audio-visual data. The media guidance application may apply the same process as described above to determine whether to identify an event based on the location of the object. MPEG-4 and HEVC compression are exemplary compression method used in this example, any other audio video compression method such as RealVideo VP9, Theora, etc. and associated data fields may be utilized by the media guidance application.

In some aspects, the media guidance application may retrieve a profile associated with the user, where the profile indicates attributes of events that are important to the user, to determine whether the events are important to the user. For example, the media guidance application may retrieve a user profile from a memory associated with the media guidance application. For example, the media guidance application may determine whether a user profile exists by first identifying the user (e.g., login information, a picture of the user, a voice of the user, a hash value uniquely identifying the user or any other known identifying information of the user).

In some embodiments, the media guidance application may identify a plurality of users and may retrieve profiles associated with each of the plurality of users. For example, the media guidance application may utilize a camera associated with the media guidance application to detect faces of users consuming media generated for display by the media guidance application. For example, the media guidance application may utilize a camera associated with user equipment 106 to identify a face associated with user 108, user 110, and user 112. The media guidance application may use an edge detection algorithm to create a mapping for features on the face of each of user 108, user 110, and user 112 (e.g., by computing vectors between points corresponding to the position of eyes, mouth, etc.) and may compare the mapping to a database comprising mappings for the facial features for each of the users. For example, the media guidance application may compute a mapping for the face of user 108 detected using a camera of user equipment 106.

The media guidance application may compare the mapping to stored facial mapping data in a profile associated with user 108. The media guidance application may determine that user 108 is associated with the profile when the computed mapping matches the stored facial mapping within a threshold amount (e.g., an acceptable degree of error).

In another example, the media guidance application may identify the users based on the presence of mobile devices associated with the users. For example, the media guidance application may communicate wirelessly (e.g., via communications path 812, described below in relation to FIG. 8) to a plurality of user equipment devices. The media guidance application may identify each user equipment device based on a unique identifier associated with each user equipment device. The media guidance application may retrieve a unique identifier for each device that is within a wireless range of user equipment 106 (e.g., by querying each device within a wireless range, or by querying a centralized network device having a listing of all devices within a wireless range, such as a router). For example, the media guidance application may transmit a network packet requesting discovery of wireless devices (e.g., user equipment 114, user equipment 118 and user equipment 106) within a range (e.g., on a same network) of the media guidance application (e.g., a media guidance application running on user equipment 106). The media guidance application may retrieve a unique identifier associated with each of the devices in response to the network packet. The media guidance application may search a database of user profiles to identify a user associated with each of the devices that responded to the ping. For example, the media guidance application may retrieve a packet from user equipment 114 which uniquely identifies the device as user equipment 114. The media guidance application may search a database of user profiles to identify a user profile having a data field that matches the unique identifier of user equipment 114. In this example, the media guidance application may determine that the user profile comprising a data field comprising the unique identifier associated with user equipment 114 is user 112.

In some embodiments, the media guidance application may identify the user based on sound detected by the media guidance application. For example, the media guidance application may have access to a user input device, such as an integrated microphone capable of detecting sound waves. The media guidance application may monitor sound in large room 102 where user equipment 106 is located. The media guidance application may filter the sound such that ambient noise, such as noise from a fan, or noise generated by the media guidance application itself, such as sound generated from speakers of user equipment 106 accessible to the media guidance application, are filtered out by the media guidance application. The media guidance application may detect that the user (e.g., user 112) is present in the room when the media guidance application detects sound from a voice of user 112. For example, the media guidance application may compute a fingerprint for a detected sound based on a pitch, frequency, etc. of the detected sound performing the filtering as described above. The media guidance application may compare a fingerprint for the voice with a database comprising fingerprints for users to identify a user matching the fingerprint. For example, the media guidance application may generate a fingerprint as described above and may compare the fingerprint to the database to determine that the fingerprint corresponding to user 112 differs from the generated fingerprint by less than a threshold amount (e.g., an acceptable degree of error).

In some embodiments, the media guidance application may compare the identity of the user with a database comprising the user profiles and may receive a pointer to a profile if one is located or may receive a NULL value if the profile does not exist. The user profile database may be located remote or local to the media guidance application (e.g., on storage 708 or on media guidance data source 818 accessed via communications network 814 described in relation to FIG. 7 and FIG. 8 below).

In some embodiments, if a user profile is located, the media guidance application may access database entries corresponding to a user's preferences. For example, the media guidance application may retrieve preferences explicitly set by the user such as data indicating favorite television show or sports team, or preferences inferred by logged user actions. For example, the media guidance application may log a viewing history of the user in a database field of the profile. The media guidance application may and may analyze the viewing history and may enumerate number of times a type of media appears in the viewing history and may determine that the user prefers the type of media when it appears over a threshold number of times. For example, the media guidance application may determine that the user likes the show "Seinfeld" when a threshold percentage of the viewing history corresponds to "Seinfeld."

In some embodiments, the media guidance application may use data from the profile to determine whether the event is important to the user. For example, the media guidance application may retrieve data from the profile indicating a user's favorite sports teams (e.g., Celta Vigo), television shows (e.g., "House of Cards", a fantasy sports roster corresponding to the user, etc. The media guidance application may determine, based on profile, whether an attribute of an event is of interest to the user. For example, the media guidance application may detect an event, such as an event corresponding to a goal scored in a soccer game. The media guidance application may retrieve or detect attributes of the event, such as a identity of a player who scored the goal, the teams that the goal was scored for and against, an excitement level of the audience (e.g., based on a volume of the cheering near when the goal is scored).

In some embodiments, when multiple users are detected by the media guidance application, the media guidance application may identify preferences for the group as a whole. For example, the media guidance application may enumerate the preferences of the users to determine an overall strongest preference for all users detected by the media guidance application. For example, the media guidance application may detect users 108, 110, and 112. The media guidance application may retrieve data from a user profile for each of users 108, 110 and 112 indicating a favorite sports team for each user. For example, the media guidance application may determine that users 108 and 110 are New York Yankees fans but user 112 is a Boston Red Sox fan. The media guidance application may determine that events corresponding to either the New York Yankees or the Boston Red Sox are important because users detected by the media guidance application have those preferences. In some embodiments, the media guidance application may weigh the preferences with respect to the users when events have competing importance. For example, a first event may correspond to a Yankees homerun and a second event may correspond to a Red Sox homerun. The media guidance application may determine that the first event is more important than the second event because more users are Yankees fans than Red Sox fans.

In some embodiments, the media guidance application may perform an object recognition algorithm to detect attributes of the event. For example, the media guidance application may process text that appears on the screen in close proximity to the event. For example, the media guidance application may process closed captioning text after the goal is scored to identify a team corresponding to the scored goal. In another example, the media guidance application may track a player having possession of a soccer ball (e.g., using an image processing algorithm as described above) and may determine that the player with the last possession of the ball scored the goal.

In some embodiments, the media guidance application may determine that the event is important to the user based on the profile data. For example, the media guidance application may determine that the user is a fan of Celta Vigo. The media guidance application may determine that the event is important if attributes of the event are associated with Celta Vigo. For example, the media guidance application may determine that the event is important when metadata associated with the audio-visual media indicates that Celta Vigo participates in a sporting event associated with the audio-visual media.

In some embodiments, the media guidance application may identify an object having importance to the user based on the profile. For example, the media guidance application may determine that the user is a fan of aviation based on data in the user profile. The media guidance application may identify planes, helicopters, and other aviation related objects as having importance to the user because the user is a fan of aviation and will likely be interested in events comprising objects associated with aviation. In another example, the media guidance application may retrieve a fantasy sports roster associated with a fantasy sports content for which the user is a participant. The media guidance application may identify players on the fantasy sports roster as objects having importance to the user because an event corresponding to one of the players may affect the user's fantasy sports score.

In some embodiments, the media guidance application may perform object recognition on a first frame corresponding to a first event in the live audio-visual media and a second frame corresponding to a second event in the catch-up audio-visual media to determine whether the object appears in one of the first and the second frame. For example, the media guidance application may determine that the first event corresponds to a goal scored in live audio-visual media 206 and that the second event corresponds to a slide tackle using the methods described above. The media guidance application may select a frame from the first event and a frame from the second event and may perform object recognition on the frames to identify respective objects in each frame. For example, the media guidance application may identify a first set of players in the first frame of the first event and a second set of players in the second frame of the second event using the object recognition algorithm as described above. The media guidance application may compare the detected objects to objects of interest to the user to determine whether a frame comprises objects of interest to the user. For example, the media guidance application may compare each player in the first set of players and each player in the second set of players to players in the user's fantasy roster to determine whether there is a match. When the media guidance application determines that there is a match, the media guidance application may determine that a corresponding frame is important.

In some aspects, the media guidance application may determine, based on the profile, an importance of a first event of the concurrently-presented events from the live audio-visual media and an importance of a second event from the concurrently-presented events from the catch-up audio-visual media. For example, the media guidance application may compute a score for the first event and the second event with respect to a predicted importance to the user. For example, the media guidance application may detect an event indicating that a goal was scored in the audio-visual media. The media guidance application may retrieve data identifying a player that scored the goal (e.g., based on the sensor information of the player that last kicked the ball) and may compare the player to the user's fantasy sports roster to determine whether the goal scored by the player will affect a fantasy sports score of a fantasy sports contest which the user is a participant. The media guidance application may determine that the importance of the event corresponds to how the event will affect the fantasy sports score of the user. For example, the media guidance application may determine that the score of the user in the fantasy sports contest will change by five due to the event. The media guidance application may determine that an event that has a greater impact on the user's fantasy sports score is more important than an event that has less of an impact on the fantasy sports score (e.g., an event that causes the user's fantasy sports score to change by two points will be deemed by the media guidance application as less important than an event that causes the fantasy sports score to change by four points).

In some embodiments, the media guidance application may determine that an importance of a first event is greater than an importance of a second event in response to determining that the object appears in the first frame. For example, the media guidance application may determine the first event corresponds to a goal scored by a player on a team that is of interest to the user (e.g., Celta Vigo, based user profile data indicating a user's favorite sports team). The media guidance application may determine that the second event corresponds to a substitution of a player on an opposing team. The media guidance application may determine that the first event is more important because the first frame comprises a player on the user's fantasy sports roster but the second frame does not.

In some embodiments, the media guidance application may determine that an importance of the second event is greater than an importance of the first event in response to determining that the object appears in the second frame. For example, the media guidance application may determine that a player on the user's roster appears in the second frame but not in the first frame. The media guidance application may determine that the second event is more important than the first event because the user may be most interested in viewing events related to players in the user's fantasy sports roster.

In some embodiments, the media guidance application may enumerate a first number of objects in the first frame matching the plurality of objects having importance to the user and may enumerate a second number of objects in the second frame matching the plurality of objects having importance to the user. For example, the media guidance application may count a number of players in the first frame and in the second frame that are on the user's fantasy sports roster. The media application rank the first frame with respect to the second frame based on a respective number of objects having importance to the user within the frame. For example, the media guidance application may rank the first frame higher than the second frame when the first frame comprises a greater number of players that are on the user's fantasy sports roster.

In some embodiments, the media guidance application may determine that the importance of the first event is greater than the importance of the second event in response to determining that the first frame has a highest respective amount of objects matching the plurality of object having importance to the user. For example, the media guidance application may determine, based on the enumeration, that the first event is more important than the second event when the first event includes more players on the user's fantasy sports roster than the second event.

In some embodiments, the media guidance application may perform the ranking for a plurality of frames of the first event and of the second event, and may rank an importance of each event based on a total number of objects detected in each frame of the plurality of frames. For example, the media guidance application may count the number of objects corresponding to each frame associated with the first event and each frame associated with the second event. The media guidance application may enumerate the number of objects in each frame associated with the first event and each frame associated with the second event and may rank the event having the highest number of objects of interest to the user highest.

In some embodiments, the media guidance application may determine an importance of the event based on a type associated with the event. The media guidance application may determine a first event type of the first event and a second event type of the second event. For example, the media guidance application may determine that a first event in live audio-visual media 206 corresponds to a goal scoring play and that a second event in the catch-up audio-visual media corresponds to a slide tackle (e.g., based on the object detecting algorithm as described above). The media guidance application may generate a string of characters describing the events as described above. For example, the media guidance application may generate a string of characters "goal scored" for the first event and "slide tackle" for the second event.

In some embodiments, the media guidance application may compare each type from the set of popular types to determine whether the first event type or the second event type matches a popular type from the set. For example, the media guidance application may compare the type of the first event to the set of important event types and may determine that the first event corresponds to an important event if the first event type matches a type from the set (e.g., if the first event type is a "goal scored" type the media guidance application may determine that the first event is important, if the second event type corresponds to a "slide tackle" the media guidance application may determine that second event is not important). For example, the media guidance application may determine, based on matching the keywords to words associated with the set of popular types, that a goal scoring event is a popular type but a slide tackle is not a popular type (e.g., because a goal may affect a team's chance of winning greater than a slide tackle). The media guidance application may determine that the importance of the first event is greater than the importance of the second event when the first event type matches a popular event from the set. In contrast, the media guidance application may determine that the importance of the second event is greater than the importance of the first event when the second event type matches the popular event type from the set.

In some embodiments, the media guidance application may monitor a first volume associated with audio of the live audio-visual media and a second volume associated with audio of the catch-up audio-visual media to determine whether the live or the catch-up audio-visual media is more important. For example, the media guidance application may determine that the media corresponding to a louder volume is more important (e.g., because a volume may be louder when fans in a sports game are cheering during an important event). For example, the media guidance application may determine that the first event has greater importance than the second event when the first volume is greater than the second volume and may determine that the second event has greater importance than the first event when the second volume is greater than the first volume. For example, when a goal is scored occurs during the first event, media guidance application may detect the voice of an announcer shouting "GOOOOAAAALL!!!" or may detect additional cheering from spectators of the sporting event. In some embodiments, the media guidance application may specifically filter for sounds known to correlate with important events. For example, the media guidance application may ignore the sounds of a car alarm when the user is watching a live broadcast of a golf event because the car alarm may have little to do with the sporting event. In contrast, the media guidance application may monitor for the sound of clapping because an increase in clapping noise may correlate with important events in the live golf event.

In some aspects, the media guidance application may resize at least one of the live audio-visual media and the catch-up audio-visual media based on a comparison of the importance of the first event with respect to the importance of the second event. For example, the media guidance application may generate for display live audio-visual media 206 larger than catch-up audio-visual media 204 (e.g., by increasing a size of the live audio-visual media with respect to the catch-up audio-visual media) when the media guidance application determines that an importance of the first event (e.g., corresponding to the live audio-visual media) is greater than an importance of the second event (e.g., corresponding to the catch-up audio-visual media). For example, as depicted in FIG. 2, the media guidance application may generate for display live audio-visual media 206 larger than catch-up audio-visual media 204 in response to determining that live audio-visual media 206 is more important to the user than catch-up audio-visual 204. In contrast, the media guidance application may increase a size of the catch-up audio-visual media 204 with respect to live audio-visual media 206 in response to determining that an importance of catch-up audio-visual media 204 is greater than an importance of live audio-visual media 206 (e.g., by generating for display the catch-up audio-visual media 204 in a full screen mode and generating for display live audio-visual media 206 in a picture-in-picture window overlaying the catch-up audio-visual media).

In some embodiments, the media guidance application may compute a size of a window associated with each audio-visual media. For example, the media guidance application may determine a number of pixels corresponding to live audio-visual media 206 and a number of pixels corresponding to catch-up audio-visual media 204. The media guidance application may compare the number of pixels corresponding to each audio-visual media to determine a percentage of a display corresponding to each audio-visual media. For example, the media guidance application may determine based on the count of the pixels that the live audio-visual media corresponds to 85% of the total number of pixels of display 202 while the catch-up audio-visual media corresponds to 15% of the total number of pixels of display 202. The media guidance application may increase a number of pixels corresponding to the catch-up audio-visual media in response to determining that an importance of an event in the catch-up audio-visual media is greater than an importance of an event in the live audio-visual media. For example, the media guidance application may increase a size of catch-up audio-visual media 204 to comprise 30% of the screen and may decrease a size of live audio-visual media 206 to comprise the remaining 60% of the screen.

In some embodiments, the media guidance application may compute a difference between an importance of the first event and an importance of the second event and may resize the media based on the difference. For example, the media guidance application may count a number of objects of interest to the user, such as a number of players on a fantasy sports roster, corresponding to the first event and to the second event. The media guidance application may compute a difference between the counts of the number of players on the fantasy sports roster and may resize at least one of the live audio-visual media and catch-up audio-visual media such that a difference in a size of the live audio-visual media with respect to a size of the catch-up audio-visual media on the first display device is proportional to the difference between the importance of the first event and the importance of the second event. For example, the media guidance application may determine that the first event comprises one player that is also on the user's fantasy sports roster and that the second event comprises two players that are also on the user's fantasy sports roster. The media guidance application may determine that based on the number of players in the first event and the second event that the second event is twice as important as the first event (e.g., because the second event has twice the number of players as the first event). The media guidance application may increase a size of catch-up audio-visual media 204 to comprise 66% of the pixels on display 202 and may decrease a size of live audio-visual media 206 to comprise 33% of the pixels on display 202.

Figure 3:
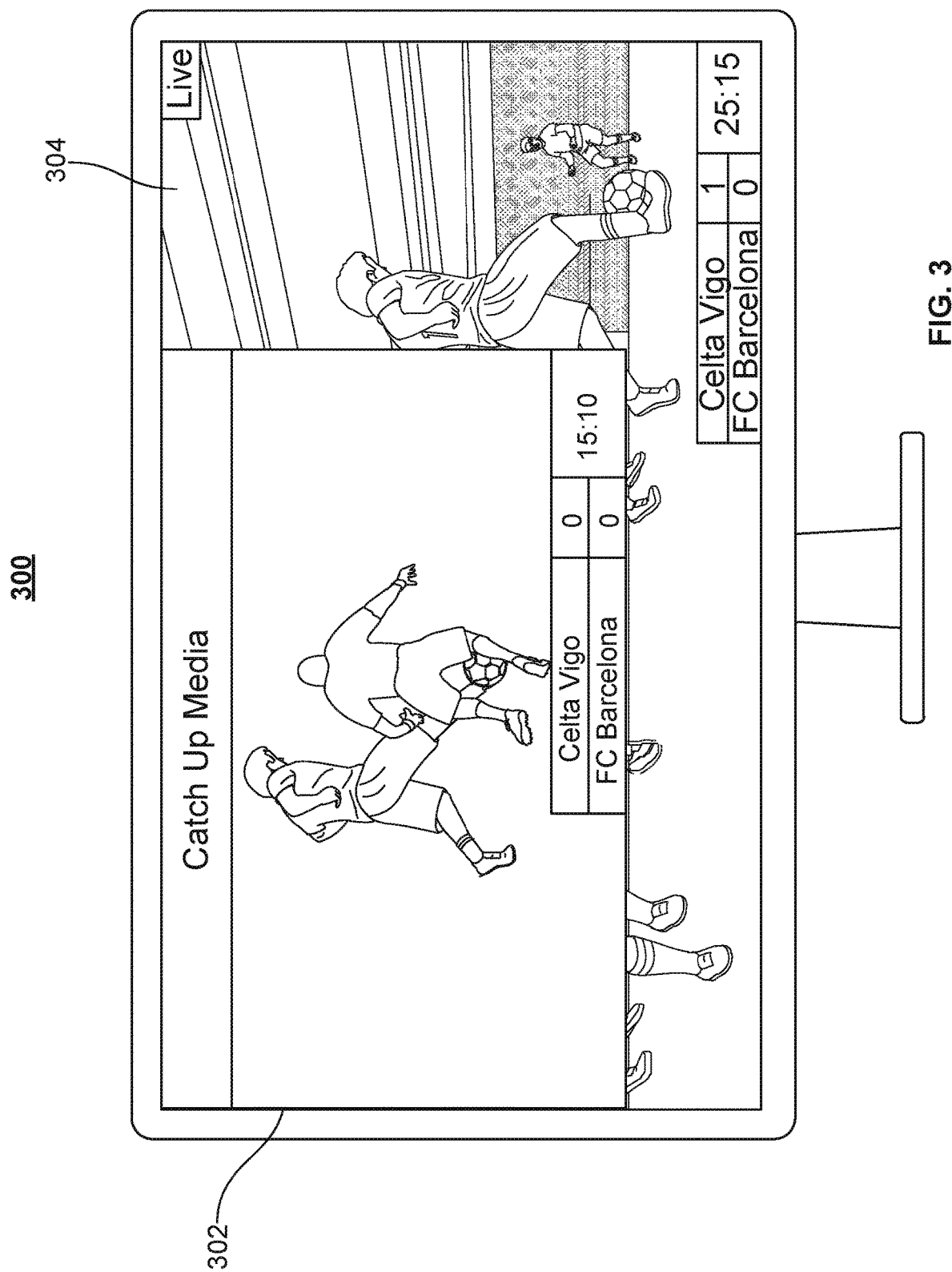
FIG. 3 shows an illustrative example of live media played back on user equipment having a large overlay of catch-up media in accordance with some embodiments of the disclosure.

FIG. 3 shows an illustrative embodiment of catch-up audio-visual media in a large window overlaying a live audio-visual media on a display of user equipment, in accordance with some embodiments of the disclosure. User equipment 300 is depicted having live audio-visual media 304 is depicted in a full-screen mode having a large overlay of catch-up audio-visual media 302, obstructing a portion of live audio-visual media 304. In some embodiments, live audio-visual media 304 may correspond to the same audio-visual media as live audio-visual media 206, and live audio-visual media 404. In some embodiments, catch-up audio-visual media 302 may correspond to the same audio-visual media as catch-up audio-visual media 204, and catch-up audio-visual media 408. The media guidance application may optionally generate for display live audio-visual media 304 and/or catch-up audio-visual media 302 on any one of user equipment 106, 114, 118, 402, 406, user television equipment 802, user computer equipment 804 and/or wireless user communications device 806.

In some embodiments, the media guidance application may increase a size of the catch-up audio-visual media from the size of catch-up audio-visual media 204 depicted in FIG. 2 to the size of catch-up audio-visual media 302 depicted in FIG. 3 in response to determining that an importance of an event corresponding to catch-up audio-visual media 204 and 302 is greater than an importance of an event corresponding to live audio-visual media 206 and 304.

In some embodiments, the media guidance application may toggle an audio of the live audio-visual media and of the catch-up audio-visual media based on their respective importance. For example, the media guidance application may toggle an audio output to the audio of the live audio-visual media in response to determining that the importance of the live audio-visual media is greater than the importance of the catch-up audio-visual media. In contrast, the media guidance application may toggle an audio output to the audio of the catch-up audio-visual media in response to determining that the importance of the catch-up audio-visual media is greater than the importance of the live audio-visual media. For example, the media guidance application may generate audio output for speakers 714 corresponding to the audio-visual media that is most important to the user.

In some embodiments, the media guidance application may toggle a display window corresponding to the catch-up audio-visual media and the live audio-visual media in response to determining a change in importance of the events corresponding to the catch-up audio-visual media and the live audio-visual media. For example, the media guidance application may generate for display the catch-up audio-visual media in a picture-in-picture window overlaying the catch-up audio-visual media. The media guidance may generate for display the live audio-visual media (e.g., live audio-visual media 206 or 304) in the picture-in-picture window and the catch-up audio-visual media in a full screen mode (e.g., catch-up audio-visual media 204 or 302).

In some embodiments, the media guidance application may detect objects in the live audio-visual media that are important to the user and may change a size of the catch-up audio-visual media overlay so that the overlay does not obstruct the objects. For example, the media guidance application may identify a location of an object that is important to the user, such as a soccer ball, and may track the location of the user within a frame of the live audio-visual media. The media guidance application may determine, based on the location of the object (e.g., location of the soccer ball on the screen) whether the catch-up audio-visual media overlays a position of the object within the frame. For example, the media guidance application may store a location of the object (e.g., soccer ball) and a location of the overlay (e.g., four points corresponding to the location of the edges of the overlay and four points corresponding to edges of the soccer ball). The media guidance application may linearly interpolate lines between each of the four coordinates to identify a shape encapsulating the object and the overlay. The media guidance application may compare the points of the interpolations to determine if lines of a first shape bisect lines of a second shape. If the media guidance application determines that the lines bisect, the media guidance application may adjust a position of the overlay such that it no longer overlays the object. For example, the media guidance application may iteratively adjust a position of the overlay until the overlay no longer blocks the object. While catch-up audio-visual media 302 is depicted overlaying a display of live audio-visual media 304, the two audio-visual media may be generated for display by the media guidance application so that no portions of the audio-visual media are obstructed. For example, the media guidance application may generate for display the live media asset side-by-side with the catch-up audio-visual media such that there is no overlap.

In some embodiments, the media guidance application may identify a first and a second display accessible to the user and may generate for display the live audio-visual media on a first device and the catch-up audio-visual media on a second device as to not obstruct a view of any media. For example, the media guidance application may identify, based on the profile, a second display device accessible to the user, such as a cell phone, tablet, headgear or other device associated with the user. For example, the media guidance application may transmit a network discovery packet over a network connection shared with a plurality of user equipment devices. The media guidance application may aggregate a list of user equipment that respond to the discovery packet. The media guidance application may determine whether a device of the aggregated list of devices is within a number of hops to the media guidance application to approximate whether a device is within a range of the first user equipment device. For example, the media guidance application may determine, that user equipment 114 is within the range of user equipment 106, but that user equipment 118 is not within the range of user equipment 106 based on a wireless signal strength between the user equipment. For example, the media guidance application may determine a first relative received signal strength (RSSI) of a wireless signal between user equipment 106 and user equipment 114 and may determine a second RSSI of a wireless signal between user equipment 106 and at user equipment 118. The media guidance application may determine, based on the first RSSI and the second RSSI an estimated distance between user equipment 106 and user equipment 114 and between user equipment 106 and user equipment 118. In another example, the media guidance application may measure received RF power over a shared wireless signal to estimate a location of the user.

Figure 4:
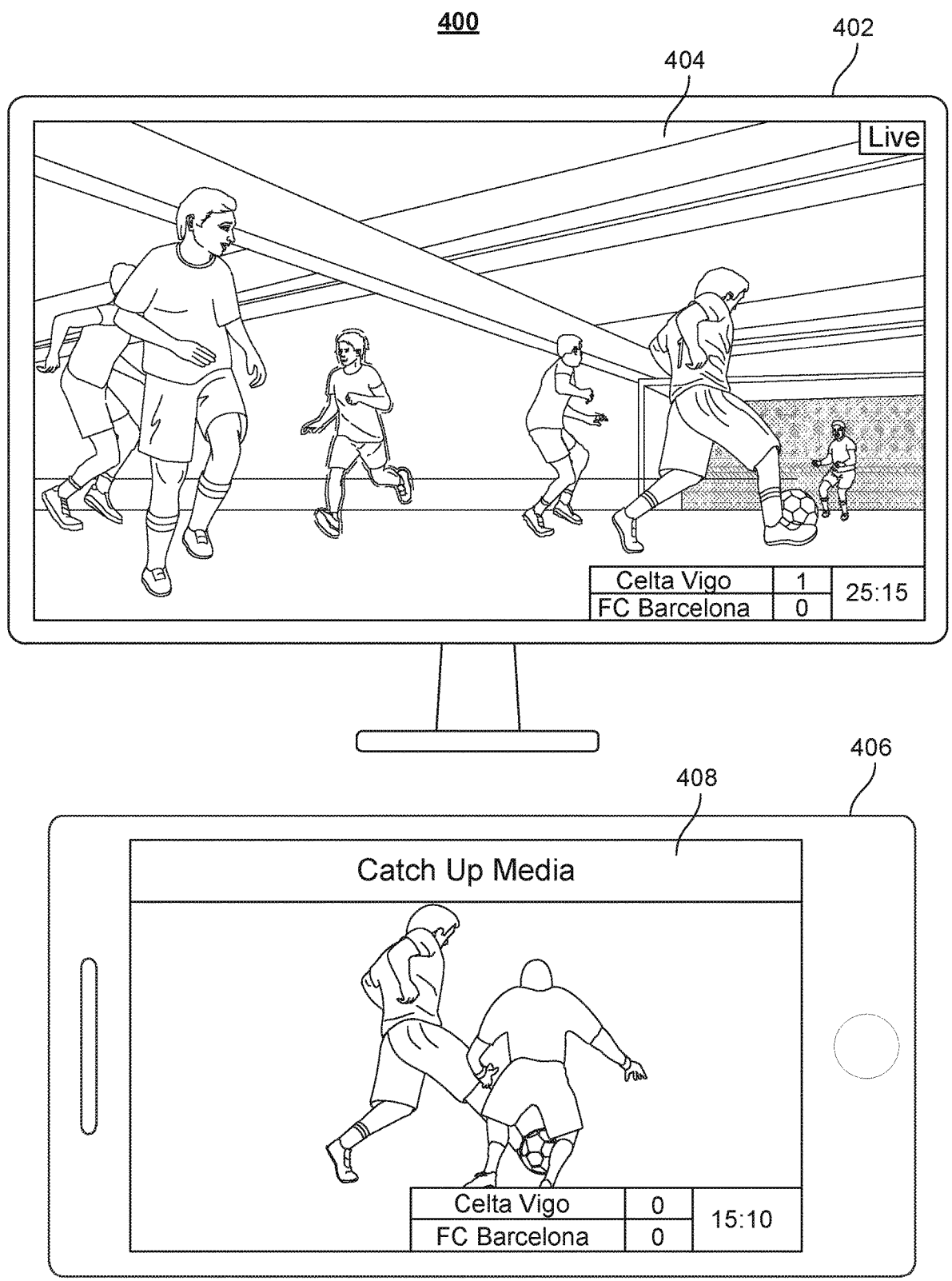
FIG. 4 shows an illustrative example of live media played back on a first user equipment and catch-up media played back on a second user equipment in accordance with some embodiments of the disclosure.

FIG. 4 shows an illustrative embodiment of live audio-visual media generated for display on first user equipment and catch-up audio-visual media generated for display on second user equipment, in accordance with some embodiments of the disclosure. System 400 is depicted comprising first user equipment 402 having live audio-visual media 404 is depicted in a full-screen mode and second user equipment 406 having catch-up audio-visual media 408 depicted in a full-screen mode. In some embodiments, live audio-visual media 404 may correspond to the same audio-visual media as live audio-visual media 206 and live audio-visual media 304. In some embodiments, catch-up audio-visual media 408 may correspond to the same audio-visual media as catch-up audio-visual media 204, and catch-up audio-visual media 302. The media guidance application may optionally generate for display live audio-visual media 404 and/or catch-up audio-visual media 408 on any one of user equipment 106, 114, 118, 402, 406, user television equipment 802, user computer equipment 804 and/or wireless user communications device 806.

In some embodiments, the media guidance application may retrieve a size of the first display (e.g., a display corresponding to first user equipment 402) and the second display (e.g., a display corresponding to second user equipment 406) and may determine where to generate for display the live and the catch-up audio-visual media based on a size of the displays. For example, the media guidance application may determine that the first display measures 50 inches diagonal and the second display measures 11 inches diagonal (e.g., based on display parameters retrieved by the media guidance application from the first and the second devices). The media guidance application may generate for display the audio-visual media having greatest importance on the larger display (e.g., the first display) and may generate for display the audio-visual media having lesser importance on the smaller display (e.g., the second display) so that the user can enjoy the more important media on the larger screen. For example, the media guidance application may determine that catch-up audio-visual media 408 is less important than live audio-visual media 404 using any of the methods described above. The media guidance application may generate for display on the first display (e.g., display of first user equipment 402) live audio-visual media 404 and may generate for display catch-up audio-visual media 408 on the second display (e.g., display of second user equipment 406) because the first display is larger than the second display.

In some embodiments, the media guidance application may vary a playback rate of the catch-up audio-visual media based on an importance of the audio-visual media. The media guidance application may identify important events in the audio-visual media as described above. The media guidance application may generate for display frames catch-up audio-visual media at a first rate different from a second rate for frames from the live audio-visual media. For example, the media guidance application may generate for display the frames from the catch-up audio-visual media at the first rate (e.g., by skipping frames, 4× fast forwarding) because those frames may not be of interest to the user. For example, the media guidance application may skip over events in the catch-up audio visual media that are not important. In contrast, the media guidance application may generate for display the frames that are important at the second rate, slower than the first rate (e.g., normal playback, 2× fast forwarding) because frames from an important event may be of interest to the user and the user may therefore want to view them at a slower rate.

In some embodiments, the media guidance application may enable a user to control various catch-settings and parameters. For example, the media guidance application may prompt the user for a speed at which the user wants to view the catch-up content having important events. The media guidance application may store, in the user profile, data indicating the speed which the user prefers to view the catch-up content for important events and a speed that the user prefers to view the catch-up content that does not correspond to important events. The media guidance application may retrieve the speed from the user profile and may present the catch-up content at the speed based on an importance of the event.

Figure 5:
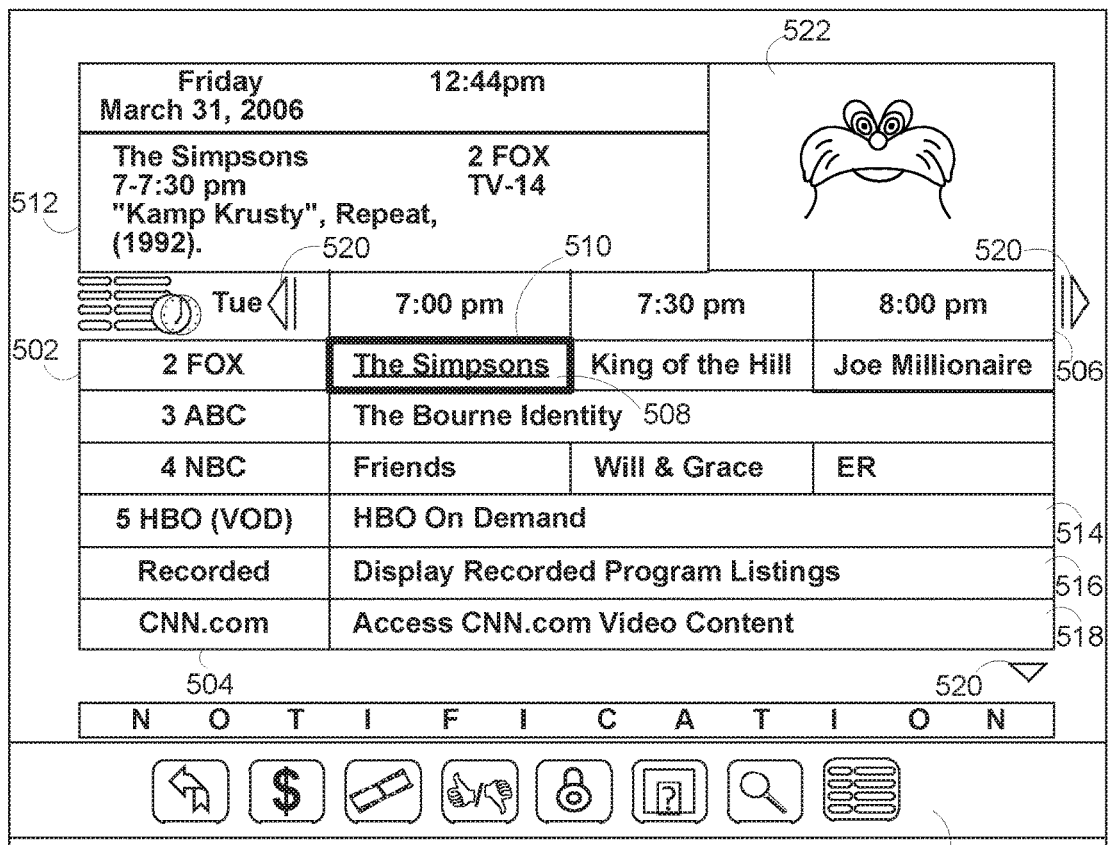
FIG. 5 shows an illustrative example of a media guidance display that may be presented in accordance with some embodiments of the disclosure.
Figure 6:
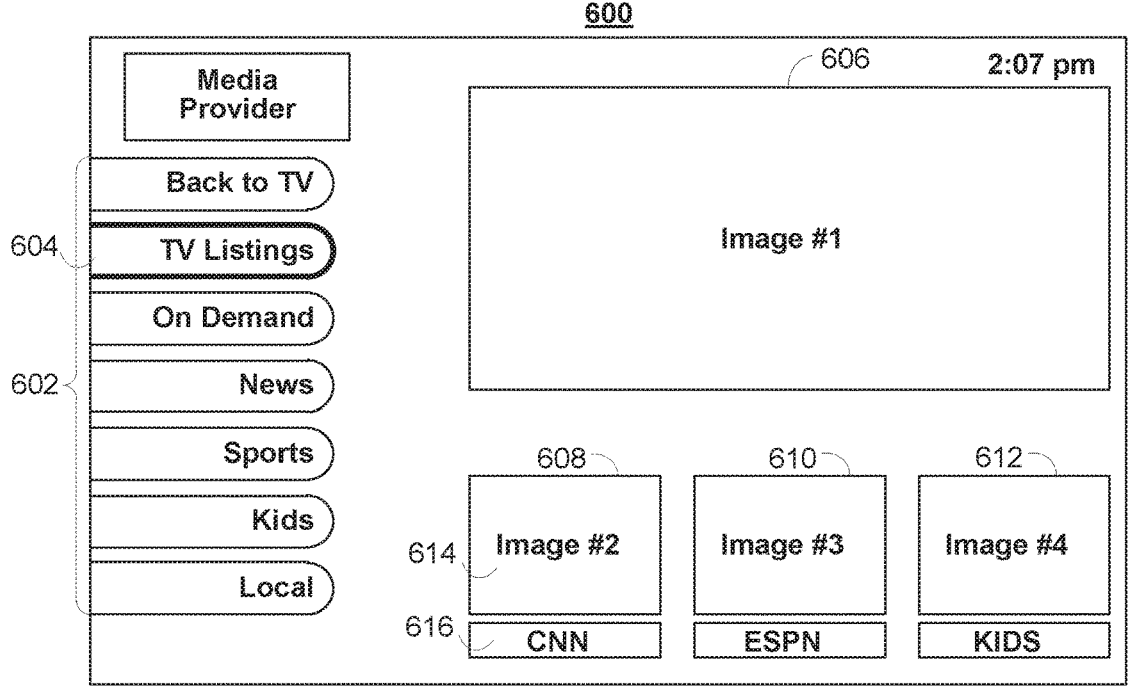
FIG. 6 shows another illustrative example of a media guidance display that may be presented in accordance with some embodiments of the disclosure.

FIGS. 5-6 show illustrative display screens that may be used to provide media guidance data. The display screens shown in FIGS. 5-6 may be implemented on any suitable user equipment device or platform. While the displays of FIGS. 5-6 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 5 shows illustrative grid of a program listings display 500 arranged by time and channel that also enables access to different types of content in a single display. Display 500 may include grid 502 with: (1) a column of channel/content type identifiers 504, where each channel/content type identifier (which is a cell in the column) identifies a different channel or content type available; and (2) a row of time identifiers 506, where each time identifier (which is a cell in the row) identifies a time block of programming. Grid 502 also includes cells of program listings, such as program listing 508, where each listing provides the title of the program provided on the listing's associated channel and time. With a user input device, a user can select program listings by moving highlight region 510. Information relating to the program listing selected by highlight region 510 may be provided in program information region 512. Region 512 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 502 may provide media guidance data for non-linear programming including on-demand listing 514, recorded content listing 516, and Internet content listing 518. A display combining media guidance data for content from different types of content sources is sometimes referred to as a "mixed-media" display. Various permutations of the types of media guidance data that may be displayed that are different than display 500 may be based on user selection or guidance application definition (e.g., a display of only recorded and broadcast listings, only on-demand and broadcast listings, etc.). As illustrated, listings 514, 516, and 518 are shown as spanning the entire time block displayed in grid 502 to indicate that selection of these listings may provide access to a display dedicated to on-demand listings, recorded listings, or Internet listings, respectively. In some embodiments, listings for these content types may be included directly in grid 502. Additional media guidance data may be displayed in response to the user selecting one of the navigational icons 520. (Pressing an arrow key on a user input device may affect the display in a similar manner as selecting navigational icons 520.)

Display 500 may also include video region 522, and options region 526. Video region 522 may allow the user to view and/or preview programs that are currently available, will be available, or were available to the user. The content of video region 522 may correspond to, or be independent from, one of the listings displayed in grid 502. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 526 may allow the user to access different types of content, media guidance application displays, and/or media guidance application features. Options region 526 may be part of display 500 (and other display screens described herein), or may be invoked by a user by selecting an on-screen option or pressing a dedicated or assignable button on a user input device. The selectable options within options region 526 may concern features related to program listings in grid 502 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 8. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 6. Video mosaic display 600 includes selectable options 602 for content information organized based on content type, genre, and/or other organization criteria. In display 600, television listings option 604 is selected, thus providing listings 606, 608, 610, and 612 as broadcast program listings. In display 600 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 608 may include more than one portion, including media portion 614 and text portion 616. Media portion 614 and/or text portion 616 may be selectable to view content in full-screen or to view information related to the content displayed in media portion 614 (e.g., to view listings for the channel that the video is displayed on).

The listings in display 600 are of different sizes (i.e., listing 606 is larger than listings 608, 610, and 612), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Users may access content and the media guidance application (and its display screens described above and below) from one or more of their user equipment devices. FIG. 7 shows a generalized embodiment of illustrative user equipment device 700. More specific implementations of user equipment devices are discussed below in connection with FIG. 8. User equipment device 700 may receive content and data via input/output (hereinafter "I/O") path 702. I/O path 702 may provide content (e.g., broadcast programming, on-demand programming, Internet content, content available over a local area network (LAN) or wide area network (WAN), and/or other content) and data to control circuitry 704, which includes processing circuitry 706 and storage 708. Control circuitry 704 may be used to send and receive commands, requests, and other suitable data using I/O path 702. I/O path 702 may connect control circuitry 704 (and specifically processing circuitry 706) to one or more communications paths (described below). I/O functions may be provided by one or more of these communications paths, but are shown as a single path in FIG. 7 to avoid overcomplicating the drawing.

Control circuitry 704 may be based on any suitable processing circuitry such as processing circuitry 706. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

In client-server based embodiments, control circuitry 704 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 8). In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 708 may be used to store various types of content described herein as well as media guidance data described above. Nonvolatile memory may also be used (e.g., to launch a boot-up routine and other instructions). Cloud-based storage, described in relation to FIG. 8, may be used to supplement storage 708 or instead of storage 708.

Control circuitry 704 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 704 may also include scaler circuitry for upconverting and downconverting content into the preferred output format of the user equipment 700. Control circuitry 704 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 708 is provided as a separate device from user equipment 700, the tuning and encoding circuitry (including multiple tuners) may be associated with storage 708.

A user may send instructions to control circuitry 704 using user input interface 710. User input interface 710 may be any suitable user interface, such as a remote control, mouse, trackball, keypad, keyboard, touch screen, touchpad, stylus input, joystick, voice recognition interface, or other user input interfaces. Display 712 may be provided as a stand-alone device or integrated with other elements of user equipment device 700. For example, display 712 may be a touchscreen or touch-sensitive display. In such circumstances, user input interface 710 may be integrated with or combined with display 712. Display 712 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 712 may be HDTV-capable. In some embodiments, display 712 may be a 3D display, and the interactive media guidance application and any suitable content may be displayed in 3D. A video card or graphics card may generate the output to the display 712. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 704. The video card may be integrated with the control circuitry 704. Speakers 714 may be provided as integrated with other elements of user equipment device 700 or may be stand-alone units. The audio component of videos and other content displayed on display 712 may be played through speakers 714. In some embodiments, the audio may be distributed to a receiver (not shown), which processes and outputs the audio via speakers 714.

The guidance application may be implemented using any suitable architecture. For example, it may be a stand-alone application wholly-implemented on user equipment device 700. In such an approach, instructions of the application are stored locally (e.g., in storage 708), and data for use by the application is downloaded on a periodic basis (e.g., from an out-of-band feed, from an Internet resource, or using another suitable approach). Control circuitry 704 may retrieve instructions of the application from storage 708 and process the instructions to generate any of the displays discussed herein. Based on the processed instructions, control circuitry 704 may determine what action to perform when input is received from input interface 710. For example, movement of a cursor on a display up/down may be indicated by the processed instructions when input interface 710 indicates that an up/down button was selected.

In some embodiments, the media guidance application is a client-server based application. Data for use by a thick or thin client implemented on user equipment device 700 is retrieved on-demand by issuing requests to a server remote to the user equipment device 700. In one example of a client-server based guidance application, control circuitry 704 runs a web browser that interprets web pages provided by a remote server. For example, the remote server may store the instructions for the application in a storage device. The remote server may process the stored instructions using circuitry (e.g., control circuitry 704) and generate the displays discussed above and below. The client device may receive the displays generated by the remote server and may display the content of the displays locally on equipment device 700. This way, the processing of the instructions is performed remotely by the server while the resulting displays are provided locally on equipment device 700. Equipment device 700 may receive inputs from the user via input interface 710 and transmit those inputs to the remote server for processing and generating the corresponding displays. For example, equipment device 700 may transmit a communication to the remote server indicating that an up/down button was selected via input interface 710. The remote server may process instructions in accordance with that input and generate a display of the application corresponding to the input (e.g., a display that moves a cursor up/down). The generated display is then transmitted to equipment device 700 for presentation to the user.

In some embodiments, the media guidance application is downloaded and interpreted or otherwise run by an interpreter or virtual machine (run by control circuitry 704). In some embodiments, the guidance application may be encoded in the ETV Binary Interchange Format (EBIF), received by control circuitry 704 as part of a suitable feed, and interpreted by a user agent running on control circuitry 704. For example, the guidance application may be an EBIF application. In some embodiments, the guidance application may be defined by a series of JAVA-based files that are received and run by a local virtual machine or other suitable middleware executed by control circuitry 704. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
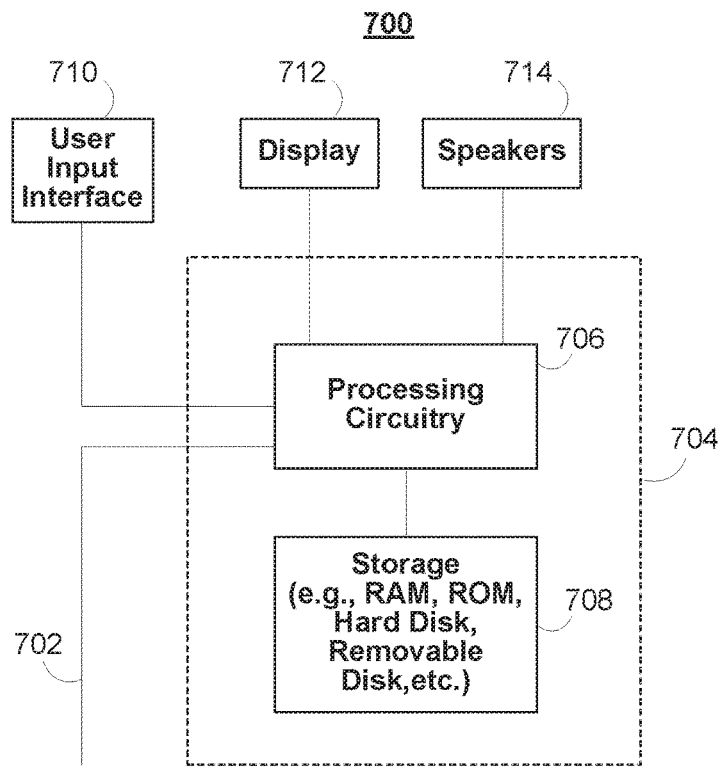
FIG. 7 is a block diagram of an illustrative user equipment device in accordance with some embodiments of the disclosure.
Figure 8:
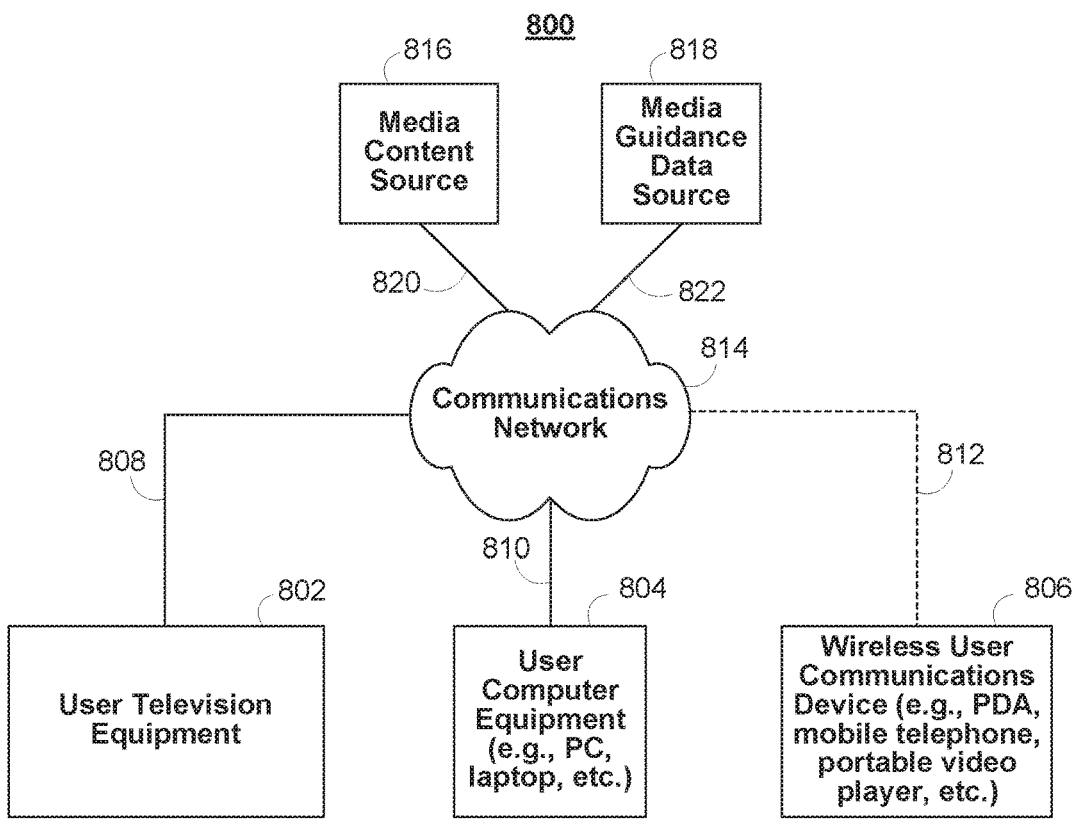
FIG. 8 is a block diagram of an illustrative media system in accordance with some embodiments of the disclosure.

User equipment device 700 of FIG. 7 can be implemented in system 800 of FIG. 8 as user television equipment 802, user computer equipment 804, wireless user communications device 806, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 7 may not be classified solely as user television equipment 802, user computer equipment 804, or a wireless user communications device 806. For example, user television equipment 802 may, like some user computer equipment 804, be Internet-enabled allowing for access to Internet content, while user computer equipment 804 may, like some television equipment 802, include a tuner allowing for access to television programming. The media guidance application may have the same layout on various different types of user equipment or may be tailored to the display capabilities of the user equipment. For example, on user computer equipment 804, the guidance application may be provided as a web site accessed by a web browser. In another example, the guidance application may be scaled down for wireless user communications devices 806.

In system 800, there is typically more than one of each type of user equipment device but only one of each is shown in FIG. 8 to avoid overcomplicating the drawing. In addition, each user may utilize more than one type of user equipment device and also more than one of each type of user equipment device.

In some embodiments, a user equipment device (e.g., user television equipment 802, user computer equipment 804, wireless user communications device 806) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 814. Namely, user television equipment 802, user computer equipment 804, and wireless user communications device 806 are coupled to communications network 814 via communications paths 808, 810, and 812, respectively.

Communications network 814 may be one or more networks including the Internet, a mobile phone network, mobile voice or data network (e.g., a 4G or LTE network), cable network, public switched telephone network, or other types of communications network or combinations of communications networks. Paths 808, 810, and 812 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 812 is drawn with dotted lines to indicate that in the exemplary embodiment shown in FIG. 8 it is a wireless path and paths 808 and 810 are drawn as solid lines to indicate they are wired paths (although these paths may be wireless paths, if desired). Communications with the user equipment devices may be provided by one or more of these communications paths, but are shown as a single path in FIG. 8 to avoid overcomplicating the drawing.

Although communications paths are not drawn between user equipment devices, these devices may communicate directly with each other via communication paths, such as those described above in connection with paths 808, 810, and 812, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 814.

System 800 includes content source 816 and media guidance data source 818 coupled to communications network 814 via communication paths 820 and 822, respectively. Paths 820 and 822 may include any of the communication paths described above in connection with paths 808, 810, and 812. Communications with the content source 816 and media guidance data source 818 may be exchanged over one or more communications paths, but are shown as a single path in FIG. 8 to avoid overcomplicating the drawing. In addition, there may be more than one of each of content source 816 and media guidance data source 818, but only one of each is shown in FIG. 8 to avoid overcomplicating the drawing. (The different types of each of these sources are discussed below.) If desired, content source 816 and media guidance data source 818 may be integrated as one source device. Although communications between sources 816 and 818 with user equipment devices 802, 804, and 806 are shown as through communications network 814, in some embodiments, sources 816 and 818 may communicate directly with user equipment devices 802, 804, and 806 via communication paths (not shown) such as those described above in connection with paths 808, 810, and 812.

Content source 816 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 816 may be the originator of content (e.g., a television broadcaster, a Webcast provider, etc.) or may not be the originator of content (e.g., an on-demand content provider, an Internet provider of content of broadcast programs for downloading, etc.). Content source 816 may include cable sources, satellite providers, on-demand providers, Internet providers, over-the-top content providers, or other providers of content. Content source 816 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 818 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 818 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 818 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 818 may provide user equipment devices 802, 804, and 806 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 708, and executed by control circuitry 704 of a user equipment device 700. In some embodiments, media guidance applications may be client-server applications where only a client application resides on the user equipment device, and server application resides on a remote server. For example, media guidance applications may be implemented partially as a client application on control circuitry 704 of user equipment device 700 and partially on a remote server as a server application (e.g., media guidance data source 818) running on control circuitry of the remote server. When executed by control circuitry of the remote server (such as media guidance data source 818), the media guidance application may instruct the control circuitry to generate the guidance application displays and transmit the generated displays to the user equipment devices. The server application may instruct the control circuitry of the media guidance data source 818 to transmit data for storage on the user equipment. The client application may instruct control circuitry of the receiving user equipment to generate the guidance application displays.

Content and/or media guidance data delivered to user equipment devices 802, 804, and 806 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider.

Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 800 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 8.

In one approach, user equipment devices may communicate with each other within a home network. User equipment devices can communicate with each other directly via short-range point-to-point communication schemes described above, via indirect paths through a hub or other similar device provided on a home network, or via communications network 814. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 816 to access content. Specifically, within a home, users of user television equipment 802 and user computer equipment 804 may access the media guidance application to navigate among and locate desirable content. Users may also access the media guidance application outside of the home using wireless user communications devices 806 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 814. These cloud resources may include one or more content sources 816 and one or more media guidance data sources 818. In addition or in the alternative, the remote computing sites may include other user equipment devices, such as user television equipment 802, user computer equipment 804, and wireless user communications device 806. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 804 or wireless user communications device 806 having content capture feature. Alternatively, the user can first transfer the content to a user equipment device, such as user computer equipment 804. The user equipment device storing the content uploads the content to the cloud using a data transmission service on communications network 814. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 7.

FIG. 9 is a flowchart of illustrative steps for resizing content on a display device based on a relative importance of the content, in accordance with some embodiments of the disclosure. Process 900 beings at 902, where the media guidance application implemented on user equipment 106, 114, 118, 402, 406, 802, 804, and/or 806 executed by control circuitry 704 generates for simultaneous display on a first display device live audio-visual media and catch-up audio-visual media, where the catch-up audio-visual media corresponds to a previously broadcast segment of the live audio-visual media. For example, the media guidance application may receive a live broadcast of audio-visual media from media content source 816 via communications network 814. The media guidance application may buffer frames corresponding to the audio-visual media in a buffer such as storage 708. The media guidance application may generate for simultaneous display on display 712 a frame corresponding to a live broadcast of the audio-visual media and a frame from the buffer (e.g., storage 708).

At 904, the media guidance application simultaneously monitors a relative importance of concurrently presented events from the live audio-visual media and from the catch-up audio-visual media. For example, the media guidance application may monitor events in the live audio-visual media (e.g., live audio-visual media 206, 304, and/or 404) and the catch-up audio-visual media (e.g., catch-up audio-visual media 204, 302, and/or 408). The media guidance application may identify a first event of the live audio-visual media and a second event of the catch-up audio-visual media based on data retrieving data from media guidance data source 818. For example, the media guidance application may retrieve subtitles from media guidance data source 818 corresponding to the events and may interpret words in the subtitles to identify the event. For example, the media guidance application may determine that the subtitles correspond to a touchdown event in a football game based on a determination that the words "The Giants scored a touchdown" in the subtitles of a New York Giants football game.

At 906, the media guidance application retrieves a profile associated with the user, where the profile indicates attributes of events that are important to the user. For example, the media guidance application may retrieve the profile from local memory, such as storage 708 or from remote storage, such as media guidance data source 818 via communications network 814. The media guidance application may analyze the profile and may determine, based on the profile, attributes of events that are important to the user. For example, the media guidance application may determine that an event may be a scene in a television show, a touchdown play in a football game, a death of a character in a movie, etc. The media guidance application may determine attributes of events that are important to the user, such as an actor that is liked by the user based on data retrieved from the user profile (e.g., data indicating a user's favorite actor/actress). The media guidance application may determine, based on the profile, that a scene from a movie comprising the user's favorite actor/actress is important to the user.

At 908, the media guidance application determines based on the profile, an importance of a first event of the concurrently presented events from the live audio-visual media an importance of a second event of the concurrently presented events from the catch-up audio-visual media. For example, as described above, the media guidance application may retrieve a profile associated with the user and may identify, based on the profile, an attribute of interest to the user (e.g., a favorite contestant in a game show). The media guidance application may identify a first event from a first the concurrently presented events, and a second event from a second of the concurrently presented events. For example, the media guidance application may determine that the audio-visual media corresponds to a live singing contest. The media guidance application may determine that the first event corresponds to a first contestant and that the second event corresponds to a second contestant. The media guidance application may determine that the second contestant is a favorite of the user (e.g., based on the profile data) and may determine that that second event is more important to the user than the first event.

At 910, the media guidance application resizes at least one of the live audio-visual media and the catch-up audio-visual media based on a comparison of the importance of the first event with respect to the importance of the second event. For example, the media guidance application may generate for display the live audio-visual media using 20% of the pixels of display 712 but may generate for display the catch-up audio-visual media using 80% of the pixels of display 712 because the media guidance application determines that the catch-up audio-visual media (e.g., catch-up audio-visual media 204, 302, and/or 408) is more important that the live audio-visual media (e.g., live audio-visual media 206, 304, and/or 404).

Figure 10:
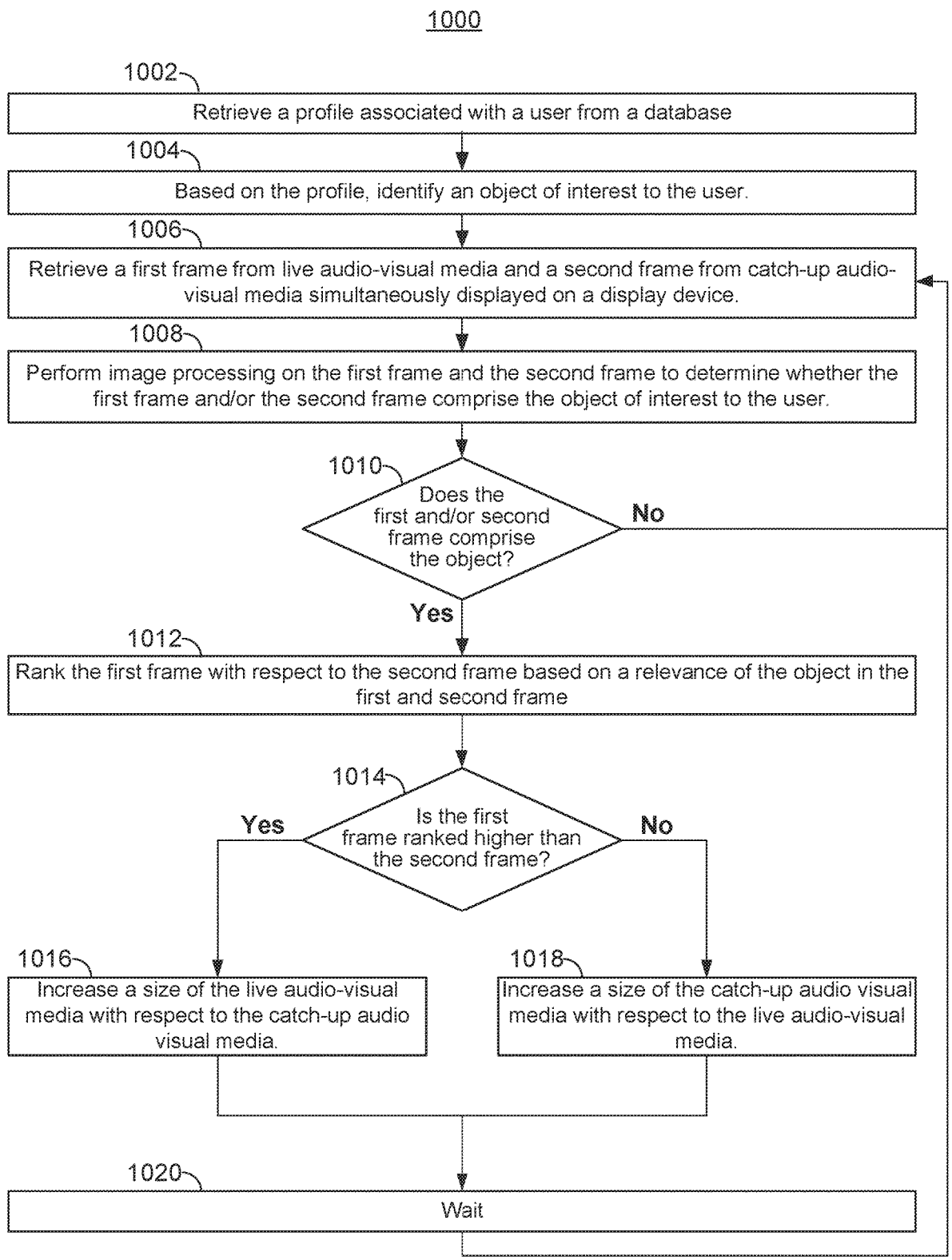
FIG. 10 is a flow chart of illustrative steps for resizing content on a display device based on an object detected in the live and the catch-up media, in accordance with some embodiments of the disclosure.

FIG. 10 depicts an illustrative flowchart of a process for resizing content on a display device based on a relative importance of the content, in accordance with some embodiments of the disclosure. Process 1000 begins at step 1002, where the media guidance application retrieves a profile associated with the user from a database. For example, the media guidance application may retrieve a profile stored locally, such as on storage 708 or from remote to the media guidance application, such as from media guidance data source 818 via communications network 814.

At step 1004, the media guidance application identifies an object of interest to the user based on the profile. For example, the media guidance application may analyze the profile of the user to determine likes and interests of the user. For example the media guidance application may analyze a history of audio-visual media consumed by the user and may identify characteristics of media shared by multiple media in the history. For example, the media guidance application may determine that the user frequently views baseball games featuring the Arizona Diamondbacks. The media guidance application may determine that an object of interest to the user may be a pitcher on the Arizona Diamondbacks because the media guidance application determines that the user is interested in the Diamondbacks.

At step 1006, the media guidance application retrieves a first frame from live audio-visual media and a second frame for catch-up audio-visual media simultaneously displayed on a display device. For example, the media guidance application may retrieve a frame from memory, such as storage 708, corresponding to the catch-up audio-visual media. The media guidance application may additionally retrieve a frame from media guidance data source 818 corresponding to the live audio-visual media. The media guidance application may select both of the frames such that the frames are generated for display, by the media guidance application, simultaneously on display 712.

At 1008, the media guidance application performs image processing on the first frame and the second frame to determine whether the first frame and/or the second frame comprises the object of interest to the user. For example, the media guidance application may perform an object recognition algorithm, as described above, on the frames to identify objects in each respective frame. For example, the media guidance application may identify a Diamondbacks pitcher in the first frame and may identify a New York Mets pitches in the second frame.

At 1010, the media guidance application determines whether the first and/or the second frame comprises the object. For example, the media guidance application may retrieve a first array listing objects identified in the first frame and a second array listing objects identified in the second frame from memory, such as storage 708. The media guidance application may compare elements from both arrays to elements of an array listing objects of interest to the user (e.g., a Diamondbacks pitcher). If the media guidance application determines that at least one of the first and second frame comprise the object, the media guidance application proceeds to step 1012, otherwise the media guidance application proceeds to step 1006.

At step 1012, the media guidance application ranks the first frame with respect to the second frame based on a relevance of the object in the first frame and the second frame. For example, the media guidance application may identify a Diamondbacks pitcher in the first frame and may identify a New York Mets pitches in the second frame as described above. The media guidance application may rank the first frame higher than the second frame because the media guidance application determines that the first frame comprises an object of interest to the user but the second frame does not. In another example, the media guidance application may rank the second frame higher than the first frame when the media guidance application determines that the second frame comprises more objects that are of interest to the user than the first frame or when the objects detected in the second frame are of greater importance than the objects in the first frame.

At step 1014, the media guidance application determines whether the first frame is ranked higher than the second frame. When the media guidance application determines that the first frame is ranked higher than the second frame, the media guidance application proceeds to step 1016. When the media guidance application determines that the second frame is ranked higher than the first frame, the media guidance application proceeds to step 1018.

At step 1016, the media guidance application increases a size of the live audio-visual media with respect to the catch-up audio-visual media. For example, the media guidance application may generate for display live audio-visual media (e.g., live audio-visual media 206, 304, and/or 404) side-by-side with catch-up audio-visual media (e.g., catch-up audio-visual media 204, 302, and/or 408) on display 712.

The media guidance application may resize the live audio-visual media on display 712 to comprise a greater area than the catch-up audio-visual media.

At step 1018, the media guidance application increases a size of the catch-up audio-visual media with respect to the live audio-visual media. For example, the media guidance application may generate for display live audio-visual media (e.g., live audio-visual media 206, 304, and/or 404) overlaying catch-up audio-visual media (e.g., catch-up audio-visual media 204, 302, and/or 408) on display 712. The media guidance application may decrease a size of the live audio-visual media so that a larger percentage of the catch-up audio-visual media is displayed on display 712.

At step 1020, the media guidance application waits a threshold amount of time before proceeding to retrieve the next frame simultaneously displayed on display 712 from the catch audio-visual media and the live audio-visual media. For example, the media guidance application may process a frame every 10 seconds so that the media guidance application does not consistently resize windows on display 712.

Figure 11:
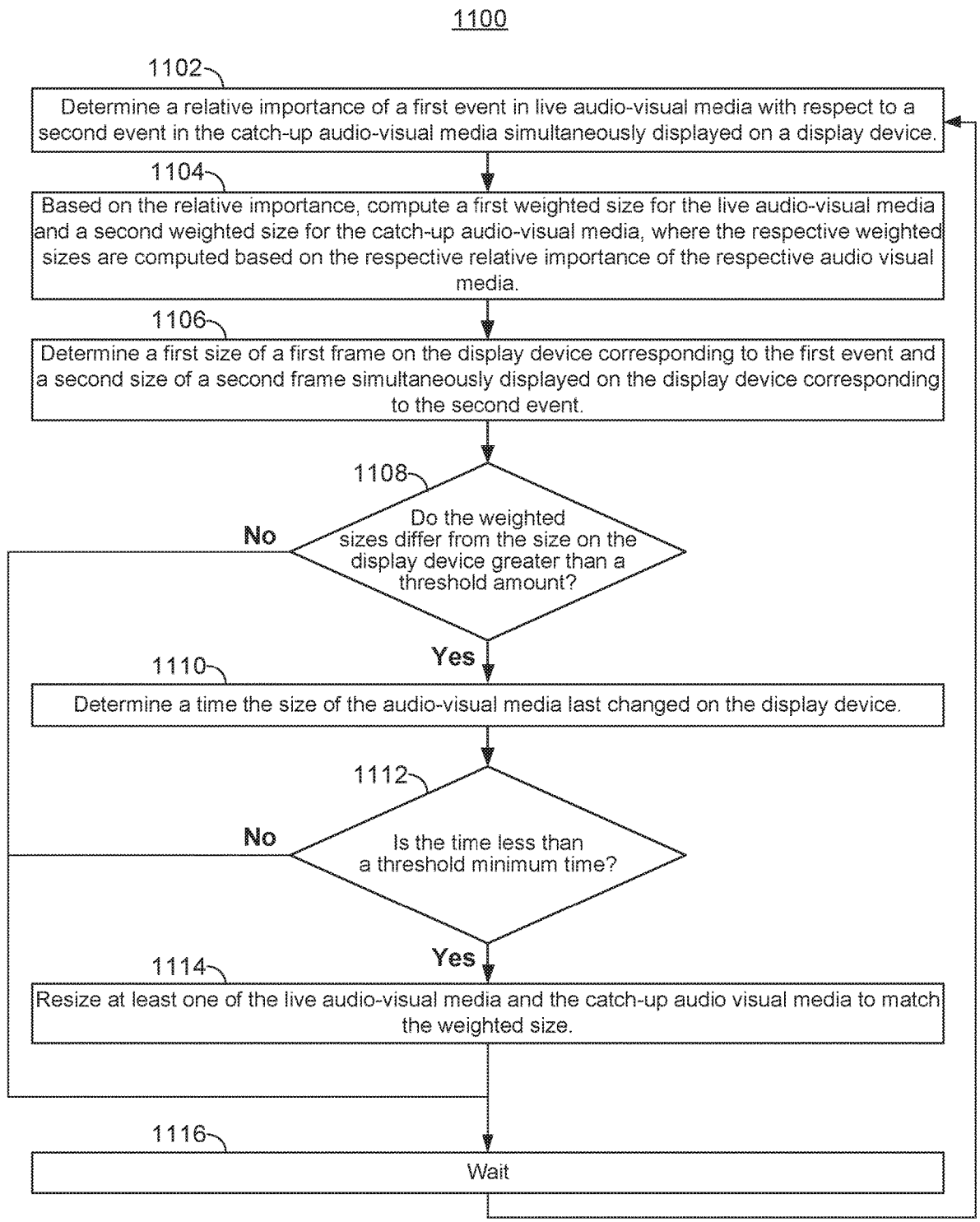
FIG. 11 is a flowchart of illustrative steps for resizing live audio-visual media and catch-up audio-visual media on a display device based on a relative importance of the audio-visual media, in accordance with some embodiments of the disclosure.

FIG. 11 depicts an illustrative flowchart of a process for resizing live audio-visual media and catch-up audio visual media on a display device based on a relative importance of the audio visual media, in accordance with some embodiments of the disclosure. Process 1100 begins at step 1102, where the media guidance application determines a relative importance of a first event in live audio-visual media (e.g., live audio-visual media 206, 304, and/or 404) with respect to a second event in catch-up audio visual media (e.g., catch-up audio-visual media 204, 302, and/or 408) simultaneously displayed on a display device. For example, the media guidance application may receive live-audio visual media and catch-up audio-visual media and may identify events in the live and the catch-up audio-visual media. The media guidance application may determine a first type for the first event and a second type for the second event as described above. The media guidance application may compare the first and second type to a database listing an importance of a plurality of event types (e.g., a database located at media guidance data source 818 or on storage 708 listing a score for how important a type is to the user) to determine a ranking of the first and second event.

At step 1104, the media guidance application computes a first weighted size for the live audio-visual media and a second weighted size for the catch-up audio-visual media based on the relative importance, where the respective weighted sizes are computed based on the respective relative importance of the respective audio-visual media. For example, the media guidance application may determine a size for the live audio-visual media and a size for the catch-up audio-visual media such that a difference in weighted size between the live and catch-up audio-visual media is proportional to the difference in importance between the events. For example, if the first type has an importance of 2 and the second type has an importance of 4, the media guidance application may determine that a first size for the first event should be half of a second size for the second event. For example, the media guidance application may determine that the first size should comprise ⅓ of the display and that the second size should comprise ⅔ of the display so that the second size is twice as large as the first size. The media guidance application may query the display (e.g., display 712) for a total size, such as a resolution or number of pixels corresponding to the display. The media guidance application may determine a size for the first frame based on the first computed weighted size (e.g., ⅓) and may determine a size for the second frame based on the second computed weighted size (e.g., ⅔). For example, if the display comprises nine million pixels, the media guidance application may determine a size for the first frame of three million pixels and a size for the second frame of six million pixels.

At step 1106, the media guidance application determines a first size of the first frame on the display device corresponding to the first event and a second size of a second frame simultaneously displayed on the display device corresponding to the second event. For example, the media guidance application may determine a size of the display as described above. The media guidance application may determine a first size of the display that is currently allocated to the live audio-visual media and a second size of the display that is allocated to the catch-up audio visual media (e.g., the media guidance application may determine that a first half of the display comprises the live audio-visual media and a second half comprises the catch-up audio-visual media.

At step 1108, the media guidance application determines whether the weighted sizes differ from the size on the display device greater than a threshold amount. For example, the media guidance application may retrieve a threshold amount from memory how big of a discrepancy between the weighted size and the size on the display is necessary before adjusting the size on the display to equal the weighted size (e.g., because numerous, small adjustments may be distracting to the user). If the sizes differ from greater than the threshold amount, the media guidance application proceeds to step 1110. If the sizes do not differ from greater than the threshold amount the media guidance application proceeds to step 1116.

At step 1110, the media guidance application determines a time when the size of the audio-visual media last changed on the display device. For example, the media guidance application may store an indication of when the size of the live and/or catch-up audio-visual media changed on the display device. For example, the media guidance application may store in memory a time indicating when the size last changed.

At step 1112, the media guidance application may determine whether the time is less than a threshold minimum time. For example, the media guidance application may compute a difference between the time the size last changed to a current time. The media guidance application may compare the time to a threshold minimum amount of time (e.g., a threshold minimum amount of time stored in in storage 708 or media guidance data source 818 indicating a minimum amount of time to wait before readjusting the size on the display. If the difference is greater than the threshold, the media guidance application proceeds to step 1114. If the difference is not greater than the threshold, the media guidance application proceeds to step 1116.

At step 1114, the media guidance application resizes at least one of the live audio-visual media and the catch-up audio-visual media to match the weighted size. For example, the media guidance application may resize the live audio visual media to comprise ⅓ of the display and may resize the catch-up audio-visual media to comprise ⅔ of the display (e.g., display 712) as described above.

At step 1020, the media guidance application waits a threshold amount of time before proceeding to retrieve the next frame simultaneously displayed on display 712 from the catch audio-visual media and the live audio-visual media. For example, the media guidance application may process a frame every 10 seconds so that the media guidance application does not consistently resize windows on display 712.

It should be noted that processes 900-1100 or any step thereof could be performed on, or provided by, any of the devices shown in FIGS. 1-4, 7-8. For example, any of processes 900-1100 may be executed by control circuitry 704 (FIG. 7) as instructed by control circuitry implemented on user equipment on user equipment 802, 804, and/or 806 (FIG. 8), 106, 114, and/or 118 (FIG. 1), and/or 402 and/or 406 (FIG. 4) in order to resize content on a display device based on a relative importance of the content. In addition, one or more steps of processes 900-1100 may be incorporated into or combined with one or more steps of any other process or embodiment.

It is contemplated that the steps or descriptions of each of FIGS. 9-11 may be used with any other embodiment of this disclosure. In addition, the steps and descriptions described in relation to FIGS. 9-11 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-4 and 7-8 could be used to perform one or more of the steps in FIGS. 9-11.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present invention may be executed using processing circuitry. For instance, resizing content on a display may be performed by processing circuitry, e.g., by processing circuitry 706 of FIG. 7. The processing circuitry, for instance, may be a general purpose processor, a customized integrated circuit (e.g., an ASIC), or a field-programmable gate array (FPGA) within user equipment 700, media content source 816, or media guidance data source 818. For example, a profile, as described herein, may be stored in, and retrieved from, storage 708 of FIG. 7, or media guidance data source 818 of FIG. 8. Furthermore, processing circuitry, or a computer program, may update settings associated with a user, preferences of what the user the user finds to be important in media, stored within storage 708 of FIG. 7 or media guidance data source 818 of FIG. 8.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for resizing content on a display device based on a relative importance of the content, the method comprising:
   generating for simultaneous display on a first display device, at a first time, live audio-visual media at a first size and catch-up audio-visual media playing in a window of a second size smaller than the first size, wherein the catch-up audio-visual media corresponds to a previously broadcast segment of the live audio-visual media;
   simultaneously monitoring a relative importance of concurrently-presented events from the live audio-visual media and from the catch-up audio-visual media as each of the live audio-visual media and the catch-up audio-visual media play back;
   retrieving a profile associated with the user, wherein the profile indicates attributes of events that are important to the user;
   determining, based on the profile, during the monitoring, that an importance of a first event occurring at a second time later than the first time of the concurrently-presented events from the live audio-visual media is smaller in importance than an importance of a second event of the concurrently-presented events from the catch-up audio-visual media; and
   resizing, at the second time, the window of the catch-up audio-visual media to a third size larger than the second size of the window at the first time based on a comparison, performed during the monitoring, of the importance of the first event with respect to the importance of the second event.

2. The method of claim 1, wherein resizing the window comprises:
   increasing a size of the window in response to determining that the importance of the second event is greater than the importance of the first event.

3. The method of claim 2, further comprising:
   toggling an audio output to audio of the live audio-visual media in response to determining that the importance of the first event is greater than the importance of the second event; and
   toggling the audio output to audio of the catch-up audio-visual media in response to determining that the importance of the second event is greater than the importance of the first event.

4. The method of claim 1, wherein resizing the window comprises:
   identifying, based on the profile, a second display device accessible to the user;
   comparing a first size of the first display device to a second size of the second display device to determine whether the first display device is larger than the second display device;
   in response to determining that the first display device is larger than the second display device:
   generating for display the window of the catch-up audio-visual media on the first display device when the importance of the second event is greater than the importance of the first event; and
   generating for display the live audio-visual media on the first display device when the importance of the first event is greater than the importance of the second event.

5. The method of claim 1, further comprising:
computing a difference between the importance of the first event and the importance of the second event; and
resizing the window of the catch-up audio-visual media such that a difference in a size of the live audio-visual media with respect to the size of the window of the catch-up audio-visual media on the first display device is proportional to the difference between the importance of the first event and the importance of the second event.

6. The method of claim 1, wherein computing the comparison of the importance of the first event with respect to the importance of the second event comprises:
determining a first event type of the first event and second event type of the second event;
retrieving, from a database, a set of popular event types;
comparing the first event type and the second event type to each event type of the set of popular event types to determine whether either of the first event type and the second event type match a popular event type from the set;
determining that the importance of the first event is greater than the importance of the second event when the first event type matches a popular event type from the set; and
determining that the importance of the second event is greater than the importance of the when the second event type matches a popular event type from the set.

7. The method of claim 1, wherein computing the comparison of the importance of the first event with respect to the importance of the second event comprises:
identifying an object of a plurality of objects having importance to the user based on the profile;
performing object recognition on a first frame corresponding to the first event and a second frame corresponding to the second event to determine whether the object appears in one of the first and the second frame;
determining that the importance of the first event is greater than the importance of the second event in response to determining that the object appears in the first frame; and
determining that the importance of the second event is greater than the importance of the first event in response to determining that the object appears in the second frame.

8. The method of claim 7, wherein determining that the importance of the first event is greater than the importance of the second event when the object appears in the first frame further comprises:
enumerating a first number of objects in the first frame matching the plurality of objects having importance to the user;
enumerating a second number of objects in the second frame matching the plurality of objects having importance to the user; and
determining that the importance of the first event is greater than the importance of the second event in response to determining that first frame has a highest respective amount of objects matching the plurality object having importance to the user.

9. The method of claim 7, wherein the object appears in the first frame, and wherein the catch-up audio-visual media overlays the live audio-visual media on the first display device, further comprising:
identifying a location of the object within the first frame;
determining, based on the location, whether the catch-up audio-visual media overlays the location of the object within the first frame; and
in response to determining that the window of the catch-up audio-visual media overlays the location of the object within the first frame, resizing the window of the catch-up audio-visual media to exclude overlaying the location of the object.

10. A system comprising control circuitry configured to resize content on a display device based on a relative importance of the content, wherein the control circuitry is configured to:
generate for simultaneous display on a first display device, at a first time, live audio-visual media at a first size and catch-up audio-visual media playing in a window of a second size smaller than the first size, wherein the catch-up audio-visual media corresponds to a previously broadcast segment of the live audio-visual media;
simultaneously monitor a relative importance of concurrently-presented events from the live audio-visual media and from the catch-up audio-visual media as each of the live audio-visual media and the catch-up audio-visual media play back;
retrieve a profile associated with the user, wherein the profile indicates attributes of events that are important to the user;
determine, based on the profile, during the monitoring, that an importance of a first event occurring at a second time later than the first time of the concurrently-presented events from the live audio-visual media is smaller in importance than an importance of a second event of the concurrently-presented events from the catch-up audio-visual media; and
resize, at the second time, the window of the catch-up audio-visual media to a third size larger than the second size of the window at the first time based on a comparison, performed during the monitoring, of the importance of the first event with respect to the importance of the second event.

11. The system of claim 10, wherein the control circuitry is further configured, when resizing the window based on a comparison of the importance of the second event, to:
increase a size of the window in response to determining that the importance of the second event is greater than the importance of the first event.

12. The system of claim 11, wherein the control circuitry is further configured to:
toggle an audio output to audio of the live audio-visual media in response to determining that the importance of the first event is greater than the importance of the second event; and
toggle the audio output to audio of the catch-up audio-visual media in response to determining that the importance of the second event is greater than the importance of the first event.

13. The system of claim 12, wherein the control circuitry is further configured, when resizing window, to:
identify, based on the profile, a second display device accessible to the user;
compare a first size of the first display device to a second size of the second display device to determine whether the first display device is larger than the second display device;
in response to determining that the first display device is larger than the second display device:

generate for display the window of the catch-up audio-visual media on the first display device when the importance of the second event is greater than the importance of the first event; and generate for display the live audio-visual media on the first display device when the importance of the first event is greater than the importance of the second event.

14. The system of claim 13, wherein the control circuitry is further configured to:
compute a difference between the importance of the first event and the importance of the second event; and
resize the window of the catch-up audio-visual media such that a difference in a size of the live audio-visual media with respect to the size of the window of the catch-up audio-visual media on the first display device is proportional to the difference between the importance of the first event and the importance of the second event.

15. The system of claim 10, wherein the control circuitry is further configured, when computing the comparison of the importance of the first event with respect to the importance of the second event, to:
determine a first event type of the first event and second event type of the second event;
retrieve, from a database, a set of popular event types;
compare the first event type and the second event type to each event type of the set of popular event types to determine whether either of the first event type and the second event type match a popular event type from the set;
determine that the importance of the first event is greater than the importance of the second event when the first event type matches a popular event type from the set; and
determine that the importance of the second event is greater than the importance of the when the second event type matches a popular event type from the set.

16. The system of claim 10, wherein the control circuitry is further configured, when computing the comparison of the importance of the first event with respect to the importance of the second event comprises, to:
identify an object of a plurality of objects having importance to the user based on the profile;
perform object recognition on a first frame corresponding to the first event and a second frame corresponding to the second event to determine whether the object appears in one of the first and the second frame;
determine that the importance of the first event is greater than the importance of the second event in response to determining that the object appears in the first frame; and
determine that the importance of the second event is greater than the importance of the first event in response to determining that the object appears in the second frame.

17. The system of claim 16, wherein the control circuitry is further configured, when determining that the importance of the first event is greater than the importance of the second event when the object appears in the first frame, to:
enumerate a first number of objects in the first frame matching the plurality of objects having importance to the user;
enumerate a second number of objects in the second frame matching the plurality of objects having importance to the user; and
determine that the importance of the first event is greater than the importance of the second event in response to determining that first frame has a highest respective amount of objects matching the plurality object having importance to the user.

18. The system of claim 16, wherein the object appears in the first frame, and wherein the catch-up audio-visual media overlays the live audio-visual media on the first display device, to:
identify a location of the object within the first frame;
determine, based on the location, whether the catch-up audio-visual media overlays the location of the object within the first frame; and
in response to determining that window of the catch-up audio-visual media overlays the location of the object within the first frame, resize the window of the catch-up audio-visual media to exclude overlaying the location of the object.

19. The method of claim 1, further comprising detecting the concurrently-presented events from the live audio-visual media and from the catch-up audio-visual media, based on sensor information retrieved from a plurality of sensors that are located in a setting depicted in the live audio-visual media.

20. The system of claim 10, wherein the control circuitry is further configured to detect the concurrently-presented events from the live audio-visual media and from the catch-up audio-visual media, based on sensor information retrieved from a plurality of sensors that are located in a setting depicted in the live audio-visual media.

* * * * *